US008819144B2

(12) United States Patent
Hardy et al.

(10) Patent No.: US 8,819,144 B2
(45) Date of Patent: Aug. 26, 2014

(54) METHOD, DEVICE, SOFTWARE AND GRAPHICAL USER INTERFACE FOR FORWARDING MESSAGES BETWEEN MESSAGE HANDLING SERVICES

(75) Inventors: Michael Thomas Hardy, Waterloo (CA); Robin Roy Glennie, Waterloo (CA)

(73) Assignee: Blackberry Limited, Waterloo (CA)

( * ) Notice: Subject to any disclaimer, the term of this patent is extended or adjusted under 35 U.S.C. 154(b) by 1424 days.

(21) Appl. No.: 11/554,999

(22) Filed: Oct. 31, 2006

(65) Prior Publication Data

US 2007/0087766 A1 Apr. 19, 2007

Related U.S. Application Data

(63) Continuation-in-part of application No. 11/249,507, filed on Oct. 14, 2005.

(51) Int. Cl.
 G06F 15/16 (2006.01)
 H04W 4/00 (2009.01)
 H04B 1/38 (2006.01)
 H04L 12/28 (2006.01)
 H04L 12/58 (2006.01)
 H04W 4/12 (2009.01)
 H04M 1/725 (2006.01)

(52) U.S. Cl.
 CPC .............. H04L 12/28 (2013.01); H04L 51/14 (2013.01); *H04L 12/5855* (2013.01); *H04L 12/587* (2013.01); *H04W 4/12* (2013.01); *H04M 1/72552* (2013.01)
 USPC ............ 709/206; 709/207; 455/466; 455/566

(58) Field of Classification Search
 CPC ....... H04L 12/58; H04L 5/14; H04L 12/5855; H04L 12/587; H04W 4/12; H04M 1/72552
 USPC .................. 709/204, 206, 207; 455/466, 566
 See application file for complete search history.

(56) References Cited

U.S. PATENT DOCUMENTS 6,151,507 A 11/2000 Laiho et al.
6,356,935 B1 * 3/2002 Gibbs ........................... 709/206

(Continued)

FOREIGN PATENT DOCUMENTS

EP 1037451 A2 3/2000
EP 1322126 A1 6/2003

(Continued)

OTHER PUBLICATIONS

All-in-one cell phones: not a one-for-all panacea: Brian Dipert, Technical Editor, edn.co.in, Oct. 31, 2002.*

(Continued)

*Primary Examiner* — Viet Vu
*Assistant Examiner* — Herman Belcher

(57) ABSTRACT

In one aspect, a computing device such as a wireless mobile communication device may receive a first type of message (e.g. an e-mail message) over a first message handling service. The device may further receive an indication, e.g. from a user interacting with the device, that the message should be forwarded to a specified recipient as a second type of message (e.g. an SMS message) over a second, different message handling service. The device may display multiple selectable destination addresses (e.g. telephone numbers) for the second type of message, each being associated with the specified recipient. If one of the destination addresses is associated with a device (e.g. a mobile telephone) that is more suitable for receiving the second type of message than any device associated with the other destination addresses, a default destination address for the second type of message may be automatically set to be that destination address.

17 Claims, 20 Drawing Sheets

(56) References Cited

U.S. PATENT DOCUMENTS

| | | |
|---|---|---|
| 6,597,918 B1 * | 7/2003 | Kim .................. 455/466 |
| 7,580,363 B2 * | 8/2009 | Sorvari et al. .................. 370/252 |
| 7,706,832 B2 * | 4/2010 | Dolgas et al. .................. 455/551 |
| 2002/0137530 A1 | 9/2002 | Karve |
| 2003/0013483 A1 * | 1/2003 | Ausems et al. .................. 455/556 |
| 2004/0057403 A1 | 3/2004 | Jerbie et al. |
| 2005/0197142 A1 * | 9/2005 | Major .................. 455/466 |
| 2005/0282564 A1 * | 12/2005 | Yoo .................. 455/466 |
| 2006/0009243 A1 * | 1/2006 | Dahan et al. .................. 455/466 |
| 2006/0010395 A1 * | 1/2006 | Aaltonen .................. 715/779 |
| 2006/0106568 A1 * | 5/2006 | Feldman .................. 702/158 |
| 2006/0116139 A1 * | 6/2006 | Appelman .................. 455/466 |
| 2006/0128404 A1 * | 6/2006 | Klassen et al. .................. 455/466 |
| 2007/0130200 A1 * | 6/2007 | Ogren .................. 707/104.1 |

FOREIGN PATENT DOCUMENTS

| | | | |
|---|---|---|---|
| EP | 1583301 A1 | 5/2005 | |
| JP | 56023529 A * | 3/1981 | .............. F02D 29/02 |
| WO | WO 02/07379 A2 | 1/2002 | |
| WO | WO 2004/066648 A1 | 5/2004 | |
| WO | WO 2004/086701 A1 | 10/2004 | |
| WO | WO 2005/067435 A2 | 7/2005 | |

OTHER PUBLICATIONS

Biemans et al., User Evaluations to Guide the Design of an Extended Personal Service Environment for Mobile Services, 2001,The Netherlands.

English Abstract of EP1037451 A2, Siemens Aktiengeselsschaft, Mar. 15, 2000.

http:/web.archive.org/web/20001205184400/http://shoutmail.com.

* cited by examiner

METHOD, DEVICE, SOFTWARE AND GRAPHICAL USER INTERFACE FOR FORWARDING MESSAGES BETWEEN MESSAGE HANDLING SERVICES

CROSS REFERENCE TO RELATED APPLICATIONS

This application is a continuation-in-part of application Ser. No. 11/249,507 filed Oct. 14, 2005, the contents of which are incorporated by reference hereinto.

FIELD OF THE INVENTION

The present application relates to electronic messaging and, in particular, to a method, device, software and graphical user interface for forwarding messages between message handling services.

BACKGROUND

Current mobile communication devices provide features beyond basic wireless telephony that include an ability to send and receive Short Message Service (SMS) messages, an ability to send and receive e-mail messages and an ability to browse online information formatted using either the known Wireless Application Protocol (WAP) or the known Hyper-Text Transfer Protocol (HTML).

Each of the features is typically implemented in a separate client application executed on the mobile communication device. To implement the features outlined above as examples, an exemplary mobile communication device may require an SMS client application, an e-mail client application, a WAP browsing application and an HTML browsing application.

Unfortunately, when a user of the exemplary mobile communication device is intent on forwarding an SMS message to a recipient associated with an e-mail address, the user is required to copy, to a temporary memory (i.e., a "clipboard"), the payload of the SMS message while using the SMS client application to review the SMS message. The user is then required to exit the SMS client application and initialize the e-mail client application. While in the e-mail client application, the user may then take steps to edit a new outgoing e-mail message. Responsively, the e-mail client application may present a user interface screen with various editboxes corresponding to fields of a standard e-mail message. Such fields including a field for indicating a recipient, a field for indicating a subject and a field for the body of the e-mail message. The user may then paste the previously copied payload of the SMS message into the editbox of the user interface screen, which editbox corresponds to the body field of the new outgoing e-mail message, specify a subject and a recipient and then direct the e-mail client application to send the new outgoing message.

Such a set of actions may not be considered intuitive to the user and may be found to be tedious and time consuming.

BRIEF DESCRIPTION OF THE DRAWINGS

In the figures which illustrate example embodiments of this application.

DETAILED DESCRIPTION

Figure 1:
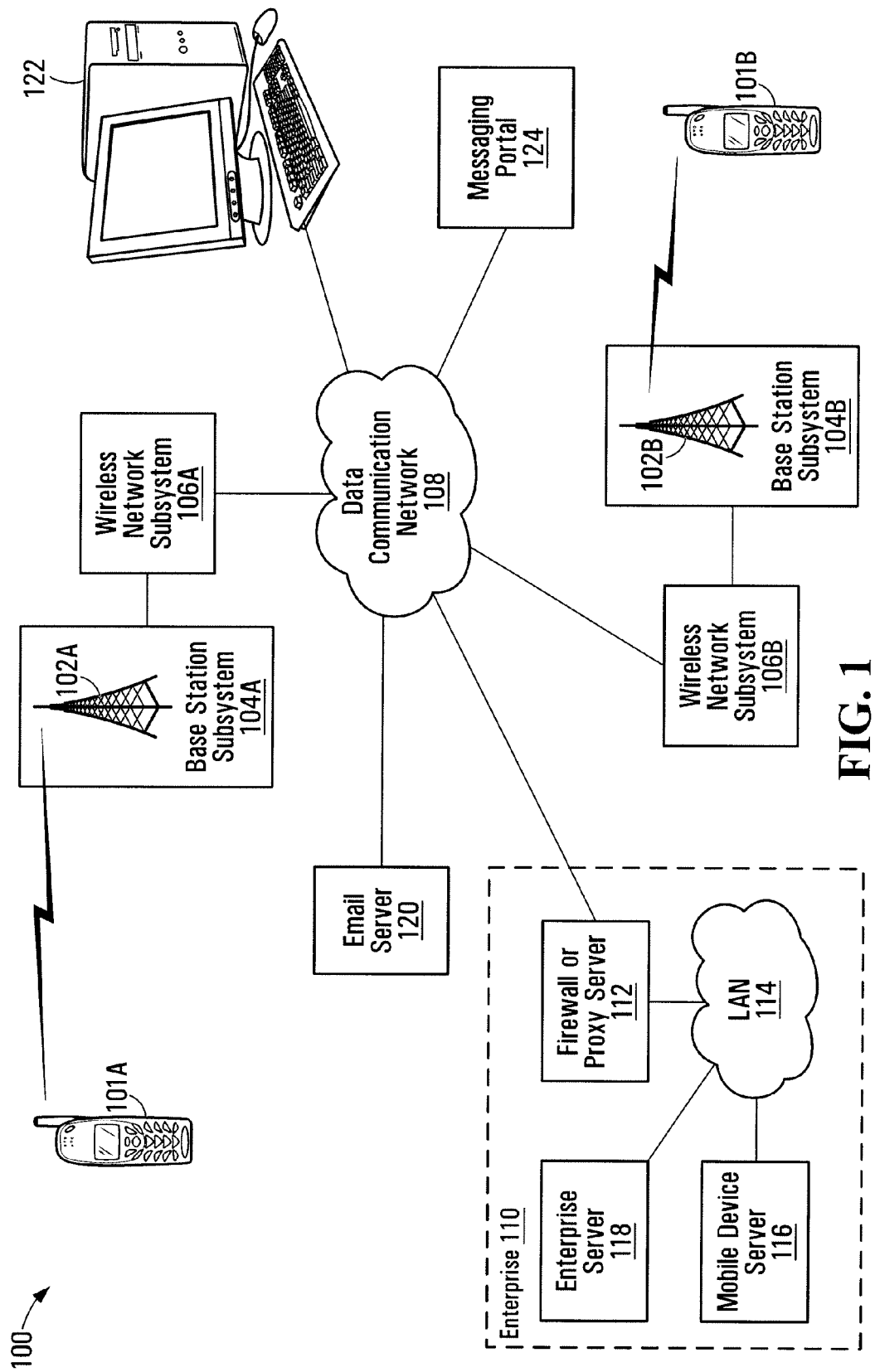
FIG. 1 illustrates elements of an exemplary network environment for a first wireless mobile communication device.

In accordance with an aspect of the present application there is provided a method comprising: receiving an indication that a received electronic mail (e-mail) message should be forwarded to a specified recipient as a Short Message Service (SMS) message; presenting a user interface including a plurality of selectable destination addresses for said SMS message, each of said destination addresses being associated with said specified recipient; if a destination address of said plurality is associated with a mobile communication device, automatically setting a default destination address for said SMS message to be said destination address.

In accordance with another aspect of the present application there is provided a computer-readable medium storing instructions which, when executed by at least one processor of a computing device, adapt said device to: receive an indication that an electronic mail (e-mail) message should be forwarded to a specified recipient as a Short Message Service (SMS) message; present a user interface including a plurality of selectable destination addresses for said SMS message, each of said destination addresses being associated with said specified recipient; if a destination address of said plurality is associated with a mobile communication device, automatically set a default destination address for said SMS message to be said destination address.

In accordance with yet another aspect of the present application there is provided a computing device having at least one processor and memory in communication with said at least one processor, said memory storing instructions which, when executed by said at least one processor, adapt said device to: receive an indication that an electronic mail (e-mail) message should be forwarded to a specified recipient as a Short Message Service (SMS) message; present a user interface including a plurality of selectable destination addresses for said SMS message, each of said destination addresses being associated with said specified recipient; if a destination address of said plurality is associated with a mobile communication device, automatically set a default destination address for said SMS message to be said destination address.

In accordance with yet another aspect of the present application there is provided a method comprising: receiving a first type of message over a first message handling service; receiving an indication that said message should be forwarded to a specified recipient as a second type of message over a second message handling service different from said first message handling service; displaying a plurality of selectable destination addresses for said second type of message, each of said destination addresses being associated with said specified recipient; if a destination address of said plurality is associated with a device that is more suitable for receiving said second type of message than any device associated with any remaining destination addresses of said plurality, automatically setting a default destination address for said second type of message to be said destination address.

In accordance with yet another aspect of the present application there is provided a method of presenting a graphical user interface, comprising: at a computing device capable of forwarding a received electronic mail (e-mail) message to a specified recipient as a Short Message Service (SMS) message, displaying on a single user interface screen: a name of said specified recipient; a type of a desired SMS destination address; and at least part of a body of said e-mail message.

In accordance with yet another aspect of the present application there is provided a graphical user interface for presentation at a computing device capable of forwarding a received electronic mail (e-mail) message to a specified recipient as a Short Message Service (SMS) message, said graphical user interface comprising: a single user interface screen including: a name of said specified recipient; a type of a desired SMS destination address; and at least part of a body of said e-mail message.

In accordance with yet another aspect of the present application there is provided a method comprising: receiving a first type of message over a first message handling service; receiving an indication that said message should be forwarded as a second type of message over a second message handling service different from said first message handling service; ascertaining whether said second message handling service requires said second type of message to be sent as multiple messages, each carrying a portion of the content of said first type of message; and if said ascertaining is in the positive, displaying on a user interface an indicator indicating that said second type of message shall be sent as multiple messages.

Other aspects and features of the present application will become apparent to those of ordinary skill in the art upon review of the following description of specific embodiments of the application in conjunction with the accompanying figures.

The description of FIGS. 1-11 below provides an overview of a system for forwarding messages between message handling services. The subsequent description of FIGS. 12-21 describes a method, device, software and graphical user interface for forwarding messages between message handling services, which are a focus of the present disclosure.

FIG. 1 illustrates elements of an exemplary network environment 100 for a first wireless mobile communication device 101A (a form of computing device). The elements of the exemplary network environment 100 include multiple wireless carrier networks and a data communication network 108, which may be considered to represent at least one wide area network, such as the present day Internet and successors, as well as, potentially, multiple local area networks. A first base station antenna 102A, with which the first wireless mobile communication device 101A may communicate wirelessly, is provided as part of a first base station subsystem 104A.

The first base station subsystem 104A connects to a first wireless network subsystem 106A. In an exemplary Global System for Mobile communications (GSM) implementation, the first wireless network subsystem 106A includes, among other components, a mobile services switching center, a home location register, a visitor location register, a relay and a Short Messaging Service Center (SMSC). As illustrated in FIG. 1, the first wireless network subsystem 106A is connected to the data communication network 108.

Also connected to the data communication network 108 is a second wireless network subsystem 106B. Similar to the first wireless network subsystem 106A, the second wireless network subsystem 106B may include a mobile services switching center, a home location register, a visitor location register, a relay and an SMSC. The second wireless network subsystem 106A connects to a second base station subsystem 104B with a second base station antenna 102B. The second base station antenna 102B may allow the second base station subsystem 104B to communicate wirelessly with a second mobile device 101B.

The first mobile device 101A may be associated with an enterprise 110 connected to the data communication network 108. The enterprise 110 may, for instance, include a firewall or proxy server 112 connecting to the data communication network 108 and to a local area network (LAN) 114. The LAN 114 may allow communication between a mobile device server 116 and an enterprise server 118.

Also connected to the data communication network 108 may be an e-mail server 120 and a desktop computer 122, which may be associated with a user having an account on the e-mail server 120. Also connected to the data communication network 108 may be a messaging portal 124.

Figure 2:
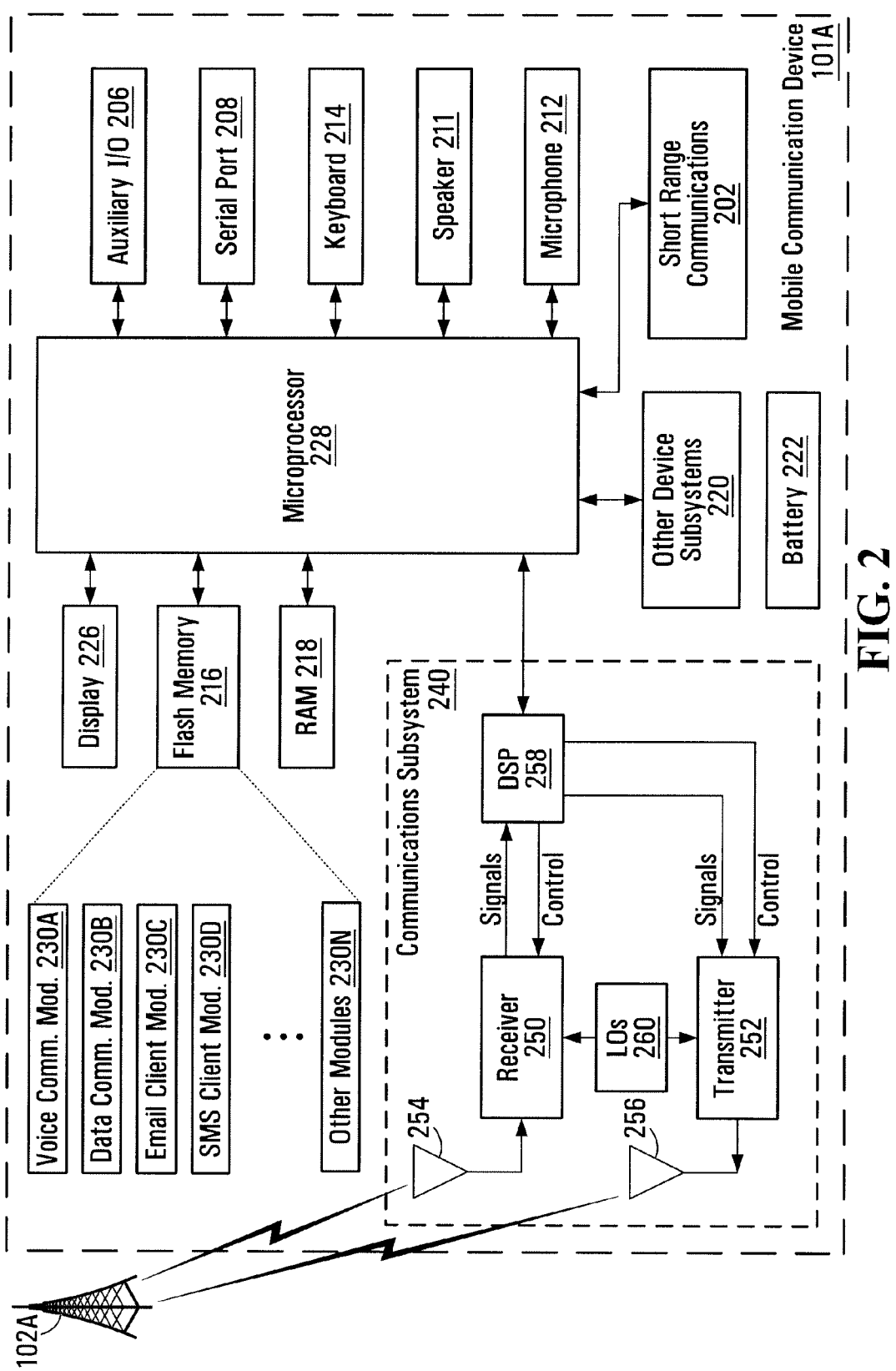
FIG. 2 illustrates components of the first wireless mobile data communication device of FIG. 1, according to an embodiment of the present application.
Figure 4:
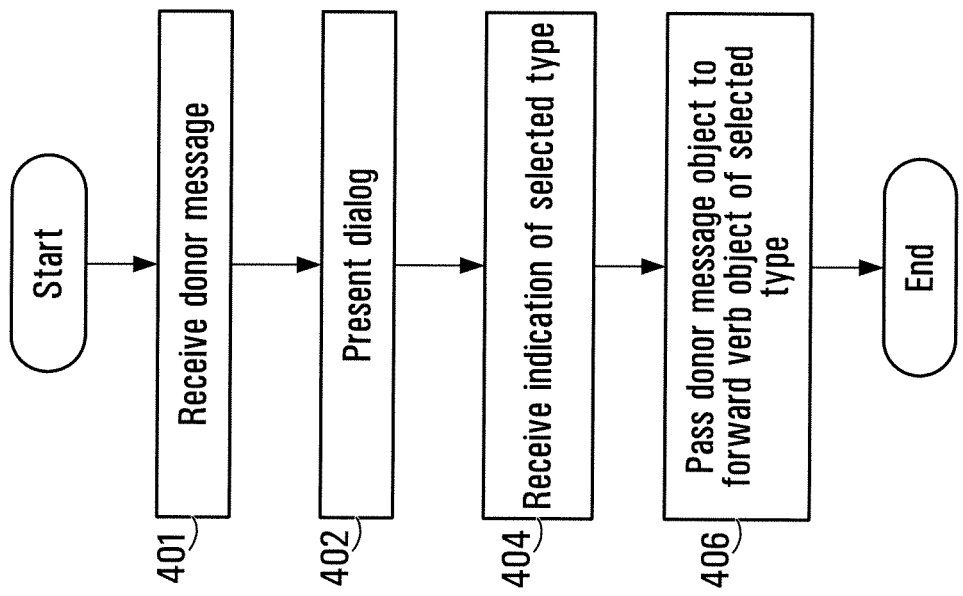
FIG. 4 illustrates steps in a method of handling messages for forwarding according to an embodiment of the present application.

FIG. 2 illustrates the first wireless mobile communication device 101A including a housing, an input device (a keyboard 214), and an output device (a display 226), which is preferably a full graphic or full color Liquid Crystal Display (LCD).

Other types of output devices may alternatively be utilized. A processing device (a microprocessor 228) is shown schematically in FIG. 2 as coupled between the keyboard 214 and the display 226. The microprocessor 228 controls the operation of the display 226, as well as the overall operation of the first mobile device 101A, in response to actuation of keys on the keyboard 214 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the first mobile device 101A are shown schematically in FIG. 2. These include: a communications subsystem 240; a short-range communications subsystem 202; the keyboard 214 and the display 226, along with other input/output devices including a set of auxiliary I/O devices 206, a serial port 208, a speaker 211 and a microphone 212; as well as memory devices including a flash memory 216 and a Random Access Memory (RAM) 218; and various other device subsystems 220. The first mobile device 101A may have a battery 222 to power the active elements of the first mobile device 101A. The first mobile device 101A is preferably a two-way radio frequency (RF) communication device having voice and data communication capabilities. In addition, the first mobile device 101A preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218.

The microprocessor 228, in addition to its operating system functions, enables execution of software applications on the first mobile device 101A. A predetermined set of software applications that control basic device operations, such as a voice communications module 230A and a data communications module 230B, may be installed on the first mobile device 101A during manufacture. An e-mail client application module 230C may also be installed on the first mobile device 101A during manufacture, to implement aspects of the application. Additionally, an SMS client application module 230D may also be installed on the first mobile device 101A during manufacture, to implement aspects of the application. As well, additional software modules, illustrated as an other software module 230N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless carrier network represented in FIG. 2 by the first base station antenna 102A. Preferably, the data items managed by the PIM application are seamlessly integrated, synchronized and updated via the wireless carrier network with the device user's corresponding data items stored or associated with a host computer system.

Communication functions, including data and voice communications, may be performed through the communication subsystem 240 and, possibly, through the short-range communications subsystem 202. The communication subsystem 240 includes a receiver 250, a transmitter 252 and one or more antennas, illustrated as a receive antenna 254 and a transmit antenna 256. In addition, the communication subsystem 240 also includes a processing module, such as a digital signal processor (DSP) 258, and local oscillators (LOs) 260. The specific design and implementation of the communication subsystem 240 is dependent upon the communication network in which the first mobile device 101A is intended to operate. For example, the communication subsystem 240 of the first mobile device 101A may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the first mobile device 101A.

When required network registration or activation procedures have been completed, the first mobile device 101A may send and receive communication signals over the wireless carrier network. Signals received from the first base station antenna 102A by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the base station antenna 102A are processed (e.g., modulated and encoded) by the DSP 258 and are then provided to the transmitter 252 for digital to analog conversion, frequency up conversion, filtering, amplification and transmission to the first base station antenna 102A via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as an SMS message or web page download, is processed by the communication subsystem 240 and is input to the microprocessor 228. The received signal is then further processed by the microprocessor 228 in preparation for output to the display 226, or alternatively to some other auxiliary I/O devices 206. A device user may also compose data items, such as e-mail messages or SMS messages, using the keyboard 214 and/or some other auxiliary I/O device 206, such as a touch-pad, a rocker switch, a thumb-wheel, or some other type of input device. The composed data items may then be transmitted to the base station antenna 102A via the communication subsystem 240.

In a voice communication mode, overall operation of the device is substantially similar to the data communication mode, except that received signals may be output to the speaker 211, and signals for transmission may be generated by the microphone 212. Alternative voice or audio I/O subsystems, such as a voice message recording subsystem, may also be implemented on the first mobile device 101A. In addition, the display 226 may also be utilized in voice communication mode, for example, to display the identity of a calling party, the duration of a voice call, or other voice call related information.

The short-range communications subsystem 202 enables communication between the first mobile device 101A and other proximate systems or devices, which need not necessarily be similar devices. For example, the short-range communications subsystem 202 may include an infrared device and associated circuits and components, or a Bluetooth™ communication module, to provide for communication with similarly-enabled systems and devices.

An SMS message Protocol Data Unit (PDU) includes a Payload element, Routing Data elements and elements including other metadata. It may be, as is currently typical, that the first mobile device 101A executes code developed using object oriented programming techniques. In which case, an SMS message PDU received the first mobile device 101A may be used as a basis, by code executed on the microprocessor 228, for the creation of a new SMS message object. The new SMS message object may be created as an instance of an SMS message model class, which defines an organization of the payload, routing data and other metadata found in the SMS message PDU. The SMS message model class may also identify those actions that may be performed on the new SMS message object, such as Open, Reply, Forward, etc. Such actions may be performed on the new SMS message object responsive to user interaction with a user interface object.

The actions that may be performed on an SMS message object may be considered to relate to instances of "verb" classes that are specific to the message handling service. As will be clear to a person of ordinary skill in the art of object oriented programming, a verb is an object encapsulation of an action in the Java™ programming language. A verb is often, but not necessarily, presented to the user as an item in a pull down menu or hotkey; a verb contains the code to perform the action on a related data model and information on how to represent itself to the user in zero or more ways. For instance, an SMS Open verb class may be associated with a method that presents a screen on the display 226 in which relevant data regarding a received SMS message PDU may be displayed. Other methods associated with the SMS Open verb class may provide for the extraction, by an instance of the SMS Open verb class (i.e., an SMS Open verb object), of information (payload, routing data and other metadata) from the SMS message object so that the information may be presented as part of the screen.

While the user has focused attention of the user interface of the first mobile device 101A on a screen representation of a given SMS message object, the user may interact with the user interface object, using the keyboard 214 and/or some other auxiliary I/O device 206, to prompt the user interface object to display a menu. Each menu item of the menu may represent an optional action that may be performed on the given SMS message object, such as Open, Reply, Forward, etc. A user may select the Forward menu item.

As a result of this selection, the user interface object may instantiate an SMS Forward verb class and pass the given SMS message object to the newly created SMS Forward verb object. Methods associated with the SMS Forward verb class, may then execute the steps illustrated in FIG. 3.

The given SMS message object may be considered an SMS donor message object. Initially, the SMS Forward verb object may receive the given SMS message object (step 301). Responsive to receiving the SMS donor message object, a method of the SMS Forward verb object may construct an SMS recipient message object (step 302) according, in part, to the SMS message model class. A further method of the SMS Forward verb object may then pass the SMS donor message object to the SMS recipient message object (step 304). A method of the SMS recipient message object may request information elements from the SMS donor message object for use in populating the SMS recipient message object. At the least, the method of the SMS recipient message object may request the payload from the SMS donor message object. A still further method of the SMS Forward verb object may then spawn (306) an SMS message editing screen object to the display 226, where the SMS message editing screen object shows information elements from the SMS recipient message object.

In view of the SMS message editing screen object, the user may input an SMS destination address for the SMS recipient message object and elect to send the SMS recipient message object. The detailed mechanism of the sending of the SMS recipient message object is considered beyond the scope of the present application.

Figure 3:
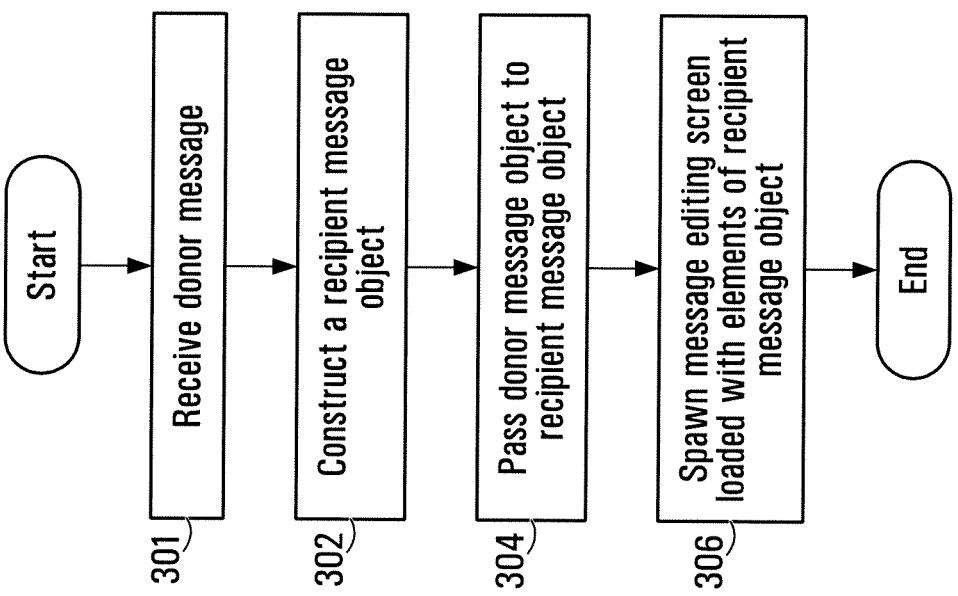
FIG. 3 illustrates steps in a known method of processing messages for forwarding.

FIG. 3 may also be used to illustrate steps in the forwarding of an e-mail message received at the first mobile device 101A. An e-mail message PDU includes a body, subject, routing data and other metadata. As in the case of the received SMS message PDU, an e-mail message PDU received the first mobile device 101A may be used as a basis, by code executed on the microprocessor 228, for the creation of a new e-mail message object. The new e-mail message object may be created as an instance of an e-mail message model class, which defines an organization of the body, subject, routing data and other metadata found in the e-mail message PDU. The e-mail message model class may also identify those actions that may be performed on the new e-mail message object, such as Open, Reply, Forward, etc. Such actions may be performed on the new e-mail message object responsive to user interaction with the user interface object.

While the user has focused attention of the user interface of the first mobile device 101A on a screen representation of a given e-mail message object, the user may interact with the user interface object, using the keyboard 214 and/or some other auxiliary I/O device 206, to prompt the user interface object to display a menu. Each menu item of the menu may represent an optional action that may be performed on the given e-mail message object, such as Open, Reply, Forward, etc. A user may select the Forward menu item.

As a result of this selection, the user interface may instantiate an e-mail Forward verb class and pass the given e-mail message object to the newly created e-mail Forward verb object. Methods associated with the e-mail Forward verb class, may then execute the steps illustrated in FIG. 3.

The given e-mail message object may be considered an e-mail donor message object. Initially, the e-mail Forward verb object may receive the given e-mail message object (step 301). Responsive to receiving the e-mail donor message object, a method of the e-mail Forward verb object may construct an e-mail recipient message object (step 302) according, in part, to the e-mail message model class. A further method of the e-mail Forward verb object may then pass the e-mail donor message object to the e-mail recipient message object (step 304). A method of the e-mail recipient message object may request information elements from the e-mail donor message object for use in populating the e-mail recipient message object. For instance, the method of the e-mail recipient message object may request the body and subject from the e-mail donor message object. A still further method of the e-mail Forward verb object may then spawn (306) an e-mail message editing screen object to the display 226, where the e-mail message editing screen object shows information elements from the e-mail recipient message object.

In view of the e-mail message editing screen object, the user may input one or more e-mail destination addresses for the e-mail recipient message object and elect to send the e-mail recipient message object. The detailed mechanism of the sending of the e-mail recipient message object is considered beyond the scope of the present application.

In contrast to an SMS message payload, a given e-mail message body may be associated with different types of addressing fields such as: a "TO:" field for indicating addresses of primary recipients, a "CC:" field for indicating addresses of secondary recipients and a "BCC:" field for indicating addresses of recipients to kept secret from the other recipients. Additionally, an e-mail message may be further distinguished from an SMS message in that, unlike an SMS message, an e-mail message includes a subject field.

Current GSM SMS standards allow for no more than 160 characters per SMS message, while current TDMA and CDMA networks allow 200 characters per SMS message. In the GSM case, the SMS message payload is standardized as 140 bytes: either 160 7-bit characters, 140 8-bit characters or 70 2-byte characters in languages such as Chinese, Korean, or Japanese when encoded using 2-byte UTF-16 character encoding.

Unfortunately, when a user elects to forward a received message in a first message handling service, it has been, up until now, assumed that the forwarded message will use the same message handling service as the received message. As such, when an SMS recipient message object is passed a donor message object, methods of the SMS recipient message object request information of the donor message object based on an assumption that the donor message object is an SMS donor message object. Equally, when an e-mail recipient message object is passed a donor message object, methods of the e-mail recipient message object request information of the donor message object based on an assumption that the donor message object is an e-mail donor message object.

To facilitate message forwarding between different message handling services, each message model class, which is used to define an object based on a received message PDU, may be required to implement a new interface. The new interface may be defined such that, when methods of a recipient message object request information from a donor message object and the donor message object is an instantiation of a message model class that implements the new interface, the donor message object may respond to the request without regard for the type of message PDU on which the donor message object is based. The new interface may be called, for example, "MessagePartsProvider".

That is, the donor message object may be an e-mail donor message object or an SMS donor message object and the recipient message object may be an e-mail recipient message object or an SMS recipient message object. The recipient message object is configured to determine whether the donor message object implements the new interface. In the event that the donor message object implements the new interface, the recipient message object may make any of a predetermined set of requests of the donor message object. By virtue of implementing the new interface, the donor message object is configured to respond to all of the predetermined set of requests.

It should be clear that, while examples herein concentrate on SMS messages and e-mail messages, other types of data, such as pages composed in a markup language, facsimile messages, Instant Messaging (IM) messages, Multimedia Message Service (MMS) messages, Address Book-based messages or Calendar-based messages, may be either the donor message object or the recipient message object.

Furthermore, a new verb class, a Forward As verb class, may be defined to allow a user to elect to forward a received message object associated with the first message handling service as a new message object using a second message handling service. Each message model may already include a method call that may be used, say, by a user interface object, to determine the verb classes to associate with a message object whose creation is based on the message model. The message models that implement the MessagePartsProvider interface may be slightly modified to include the "Forward As" verb class in the list of verb classes returned by this method call.

In operation, while the user has focused attention of the user interface of the first mobile device 101A (e.g., opened or highlighted in a list) on a screen representation of, for example, a given e-mail message object, the user may interact with the user interface object, using the keyboard 214 and/or some auxiliary I/O device 206, to prompt the user interface object to display a menu. Some of the menu items may represent an optional action that may be performed on the given e-mail message object, such as Open, Reply, Forward, Forward As, etc.

A user may select the Forward As menu item. As a result of this selection, the user interface object may instantiate the Forward As verb class and pass the given e-mail donor message object to the newly created Forward As verb object. The Forward As verb object may then call associated methods to execute the steps illustrated in FIG. 4.

The given e-mail donor message object may be considered a generic donor message object. That is, since the e-mail model class, instantiation of which led to the given e-mail donor message object, implemented the MessagePartsProvider interface, the donor message object need not be a SMS donor message object to appropriately respond to requests from an SMS recipient message object.

Initially, the Forward As verb object may receive the given e-mail donor message object (step 401). Responsive to receiving the given e-mail donor message object, a method of the Forward As verb object may construct a dialog object and instruct the dialog to present itself on the display 226 (step 402). The dialog object may include as many options as types (E.G., SMS, e-mail) of Forward verb objects are available on the first mobile device 101A. The user may interact with the dialog object, using the keyboard 214 and/or some auxiliary I/O device 206, to select one of the presented types. A method of the Forward As verb object may receive an indication of the selected type (step 404), say, from a method of the dialog object. Responsive to receiving the indication of the selected type, a method of the Forward As verb object may then pass the generic donor message object (step 406) to the Forward verb object of the selected type. The Forward verb object of the selected type may then operate normally, as discussed above in conjunction with reference to FIG. 3.

Figure 5:
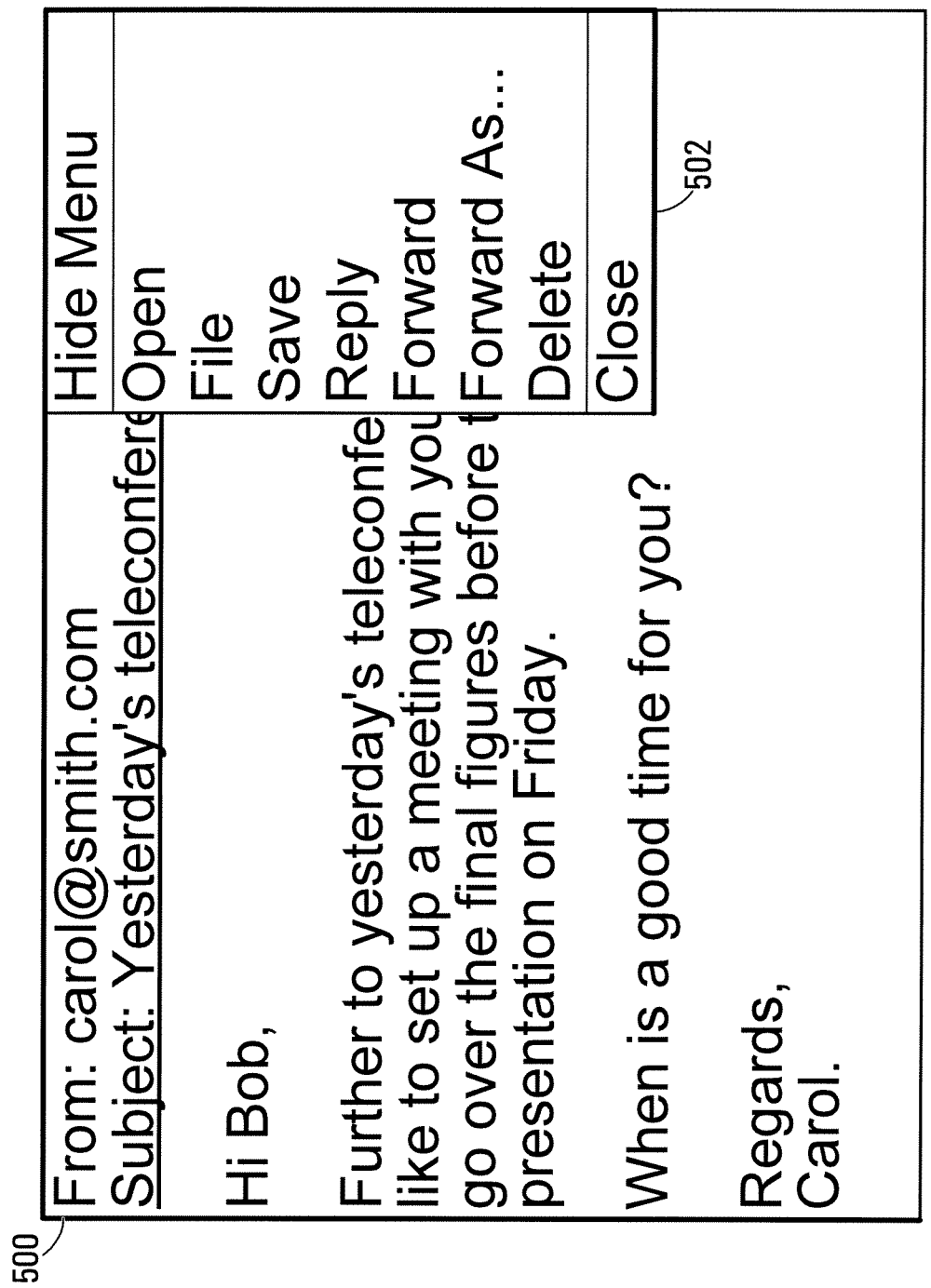
FIG. 5 illustrates an exemplary user interface screen for viewing an e-mail message.

Exemplary operation of the Forward As verb object in combination with the Forward verb object may be considered in view of FIGS. 5-10. FIG. 5 illustrates an exemplary e-mail message viewing screen 500 presented by the user interface object allowing a user to view elements of a received e-mail donor message object. The user may, as discussed above, interact with the user interface object to prompt the user interface object to display a menu 502.

Figure 6:
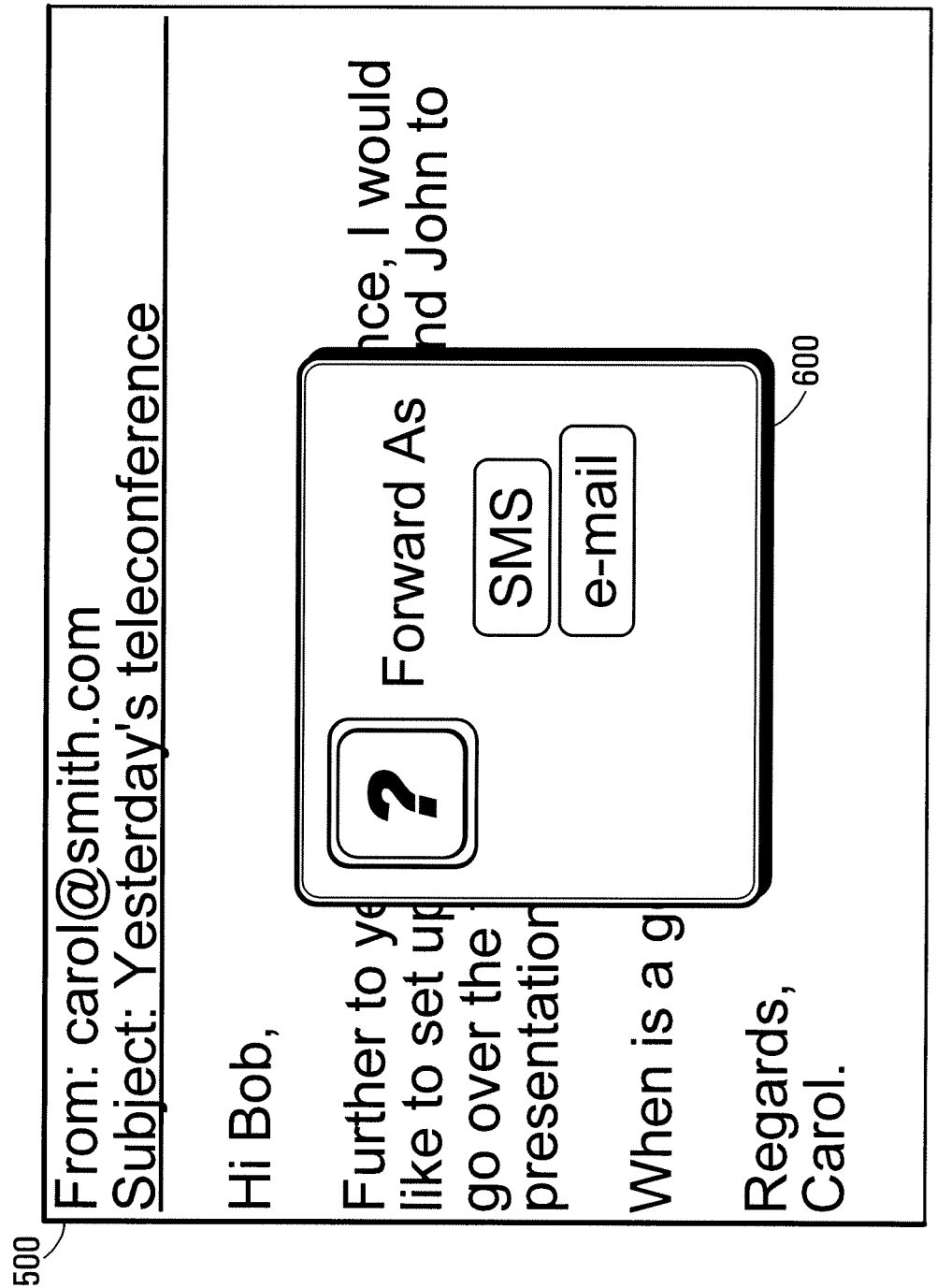
FIG. 6 illustrates the exemplary e-mail message viewing user interface screen of FIG. 5 overlaid by a dialog according to an embodiment of the present application.

User selection of the Forward As menu item results, as discussed above, in instantiation of the Forward As verb object and the user interface object passing the given e-mail donor message object to the Forward As verb object. The Forward As verb object, responsive to receiving the given e-mail donor message object (step 401, FIG. 4) arranges the presentation (step 402) of a dialog object 600, as illustrated in FIG. 6. The exemplary dialog object 600 presents optional message types (message handling services) e-mail and SMS.

An indication of a user selection of the SMS message type is received (step 404) by the Forward As verb object. Responsive to receiving the indication of the user selection of the SMS message type, a method of the Forward As verb object may then pass (step 406) the received e-mail donor message object to the SMS Forward verb object.

The received (step 301, FIG. 3) e-mail donor message object may be considered, by the SMS Forward verb object, to be a donor message object without identity, since the SMS Forward verb object does not need to perform any object type-specific processing on the donor message object. A method of the SMS Forward verb object may construct an SMS recipient message object (step 302) according, in part, to the SMS message model class. A further method of the SMS Forward verb object may then pass the received e-mail donor message object to the SMS recipient message object (step 304). A method of the SMS recipient message object may request information elements from the received e-mail donor message object for use in populating the SMS recipient message object. A still further method of the SMS Forward verb object may then spawn (step 306) an SMS message editing screen object to the display 226, where the SMS message editing screen object shows information elements from the SMS recipient message object.

Figure 7:
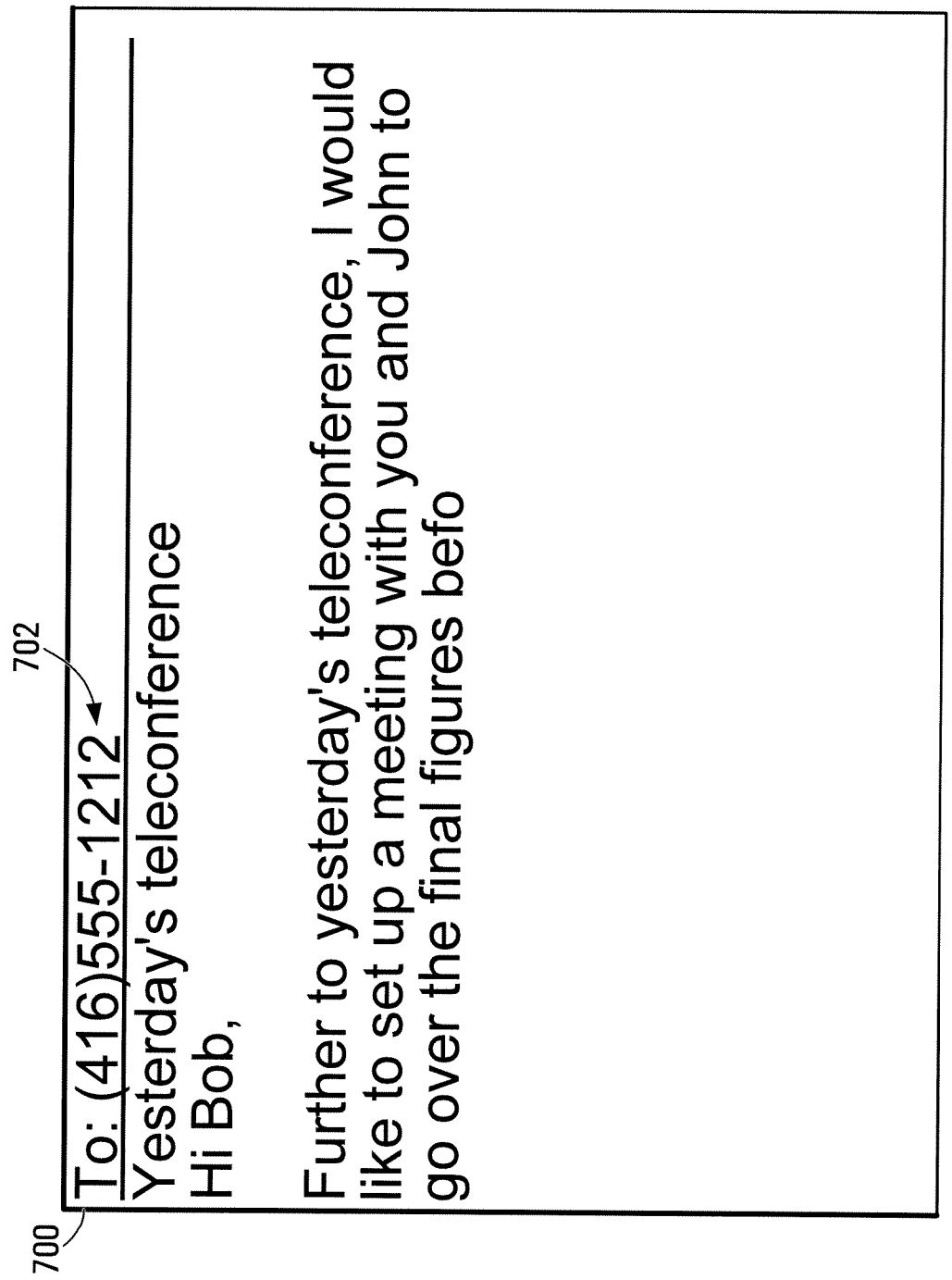
FIG. 7 illustrates an exemplary SMS message composition user interface screen resulting from the selection of the e-mail option in the dialog of FIG. 6.

FIG. 7 illustrates an exemplary SMS message editing screen object 700 spawned by the still further method of the SMS Forward verb object with information elements from the SMS recipient message object based on responses from the received e-mail donor message object, whose information elements are displayed in the exemplary e-mail message viewing screen 500 of FIG. 5. The exemplary SMS message editing screen object 700 allows a user to provide an SMS destination address 702 for the SMS recipient message object.

Figure 8:
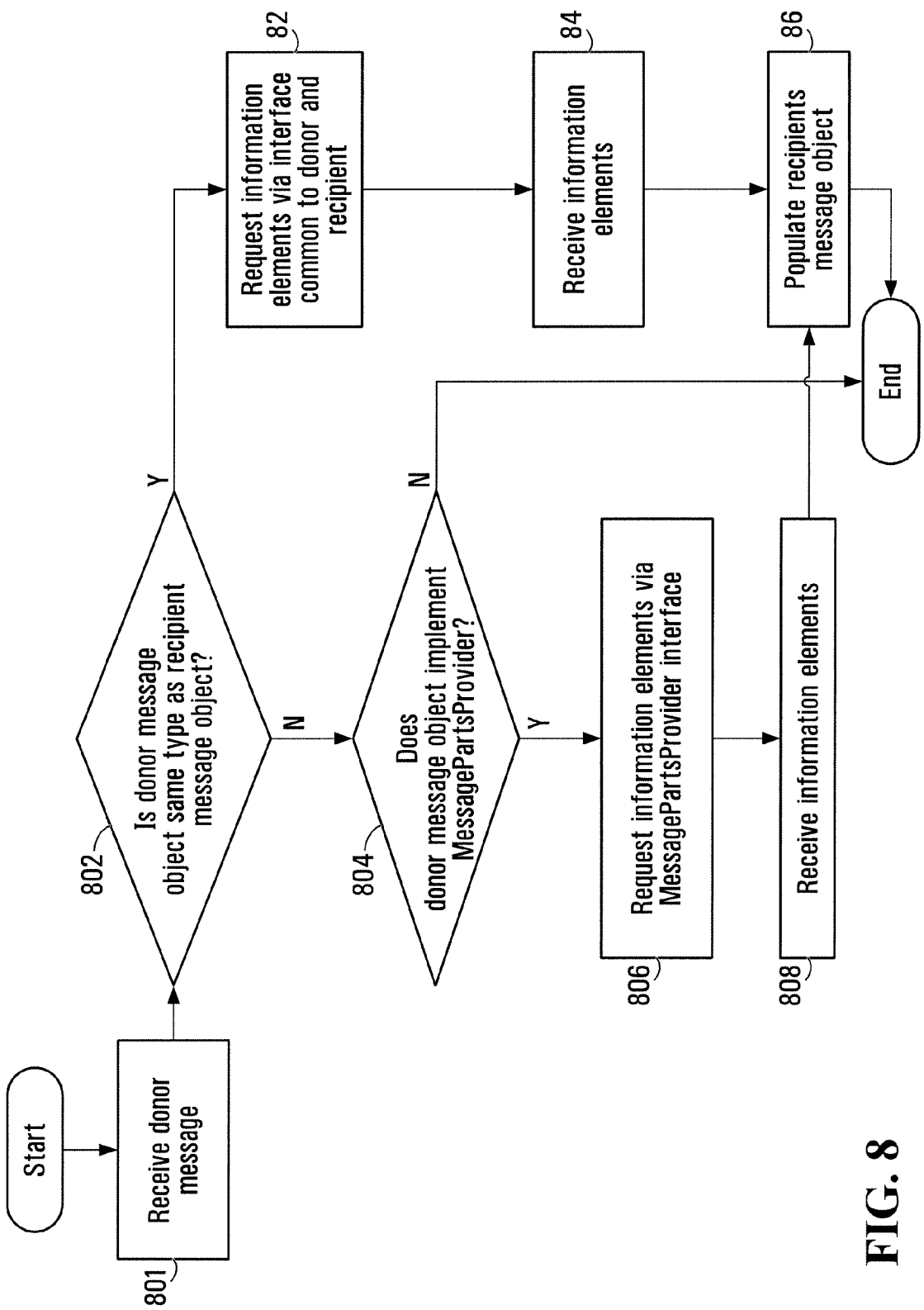
FIG. 8 illustrates steps in a method of processing a donor message object to produce a recipient message object according to an embodiment of the present application.

FIG. 8 illustrates steps of an exemplary method undertaken by the SMS recipient message object to populate itself. Initially, the SMS recipient message object receives (step 801) the received e-mail donor message object. Before the method of the SMS recipient message object requests information elements from the received e-mail donor message object for use in populating the SMS recipient message object, the method of the SMS recipient message object may determine (step 802) whether the received e-mail donor message object is of the same type as the recipient message object. If, as in this case, the type of the donor message object differs from the type of the recipient message object, the method of the SMS recipient message object may determine (step 804) whether the received e-mail donor message object implements the MessagePartsProvider interface. To this end, the SMS recipient message object may request that the received e-mail donor message object indicate whether the MessagePartsProvider interface is implemented. Upon determining that the received e-mail donor message object does implement the MessagePartsProvider interface, the method of the SMS recipient message object may request (step 806) information elements (e.g., a Subject element; a Body element) from the received e-mail donor message object via the MessagePartsProvider interface. The SMS recipient message object may then receive (step 808) the requested information elements from the received e-mail donor message object. Using the received Subject element and Body element, the SMS recipient message object may populate itself (step 816).

Upon determining (step 804) that the received donor message object does not implement the MessagePartsProvider interface, the method of the SMS recipient message object may end, since it may be considered that the does not have an appropriate interface to handle the donor message object.

Upon determining (step 802), in another case, that the received donor message object is of the same type as the recipient message object, the method of the SMS recipient message object may request (step 812) information elements (e.g., a Payload element) from the received donor message object via an SMS-specific interface. The SMS recipient message object may then receive (step 814) the information elements from the received donor message object. Using the received Payload element, the SMS recipient message object may populate itself (step 816).

When the still further method of the SMS Forward verb object spawns (step 306, FIG. 3) the exemplary SMS message editing screen object 700, a method of the exemplary SMS message editing screen object 700 may request the Payload element from the SMS recipient message object. It may be that the Payload element exceeds the character limit of a standard SMS message, in which case, the exemplary SMS message editing screen object 700 may truncate the received Payload element (as shown in FIG. 7) to conform to the SMS standard. The exemplary SMS message editing screen object 700 may inform the user, for example, by way of a dialog object, that the payload has been truncated.

SMS message editing screen classes are known to exist that allow the construction of a "macro" SMS message with more characters than are allowed in a standard SMS message. Such a macro SMS message editing screen object may request the Payload element from the SMS recipient message object and the SMS recipient message object may respond to the request with a Payload element that exceeds the character limit of a standard SMS message. In such a case, the macro SMS message editing screen object may split the Payload element into Payload sub-elements that fit into the character limit of a standard SMS message and arrange the transmission of multiple SMS messages, where each SMS message includes one of the Payload sub-elements.

The user may address the SMS message by directly entering a telephone directory number (i.e., routing data, an SMS destination address) of an SMS-capable entity (say, the second mobile device 101B) in the address field presented as part of the user interface of the SMS client application. Alternatively, rather than directly entering a telephone directory number, the user may indicate, to the exemplary SMS message editing screen object 700, a desire to select a contact from within a list of contact information maintained by the PIM application. Once the contact is selected, the user may then be presented with all telephone directory numbers associated with the contact. The user may then select one of the presented telephone directory numbers as the SMS destination address 702 for the SMS recipient message object.

When the user has completed composition of the SMS message payload, the user may indicate that the SMS message payload is complete and should be sent. Further objects executed by the first mobile device 101A may then arrange the transmission of an SMS message based on the SMS recipient message object to the first base station antenna 102A via the communication subsystem 240. The detailed mechanism of the sending of the SMS recipient message object is considered beyond the scope of the present application.

The SMS message received at the first base station antenna 102A may be later received at the mobile services switching center in the first wireless network subsystem 106A. From the mobile services switching center, the SMS message may be sent to the SMSC, which may also be in the first wireless network subsystem 106A. The SMSC may arrange the delivery of the SMS message to the second mobile device 101B via the data communication network 108, the second wireless network subsystem 106B and the second base station subsystem 104B.

Figure 9:
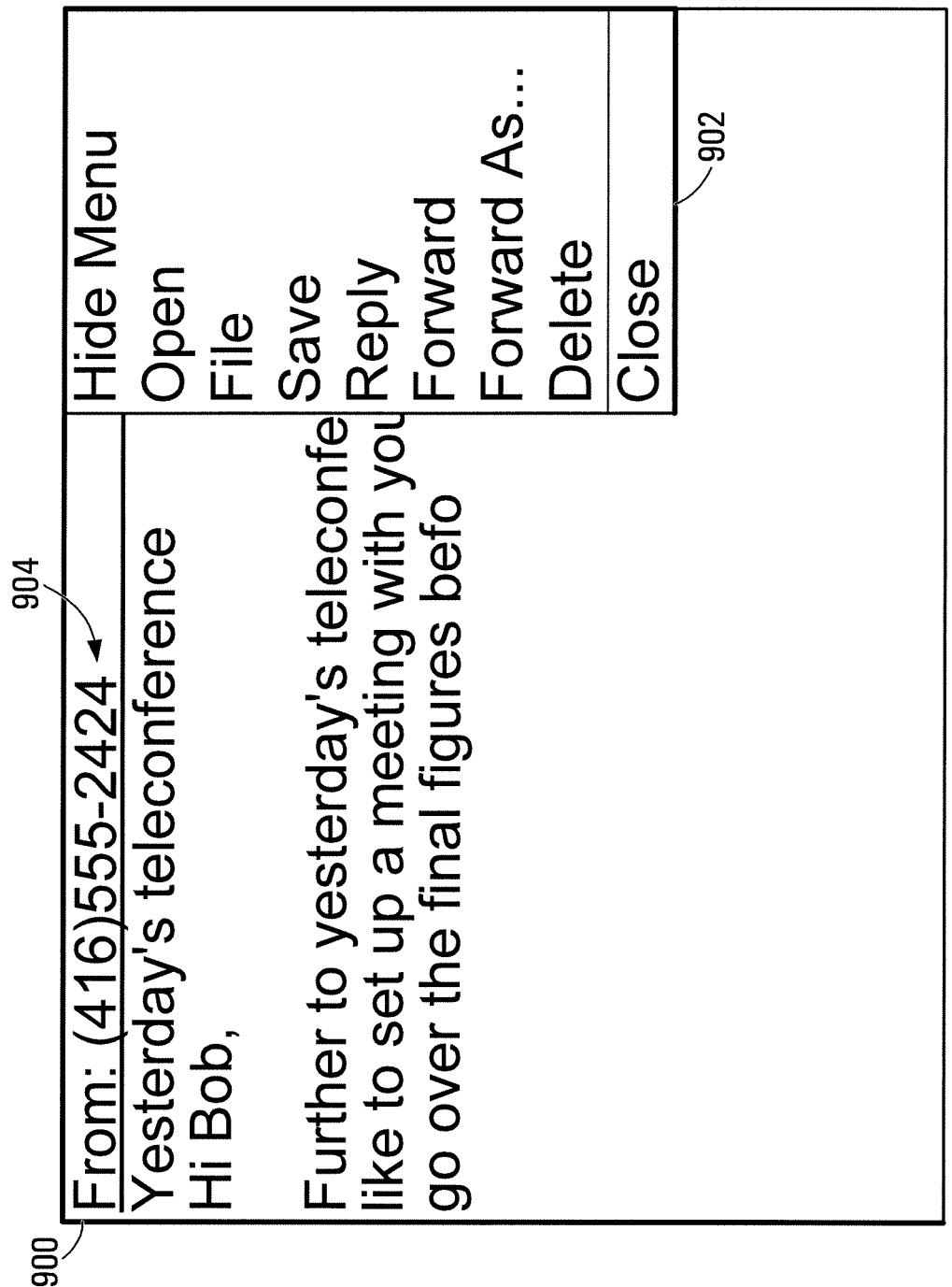
FIG. 9 illustrates an exemplary user interface screen for viewing an SMS message.

FIG. 9 illustrates an exemplary user interface screen 900 presented by a user interface object of the second mobile device 101B allowing a user to view information elements of a received SMS donor message object. In the illustrated case, the received SMS donor message object is based on the new SMS donor message object, information elements of which are presented in the exemplary SMS message editing screen object 700 of FIG. 7. The user may, as discussed above, interact with the user interface object to prompt the user interface object to display a menu 902.

Figure 10:
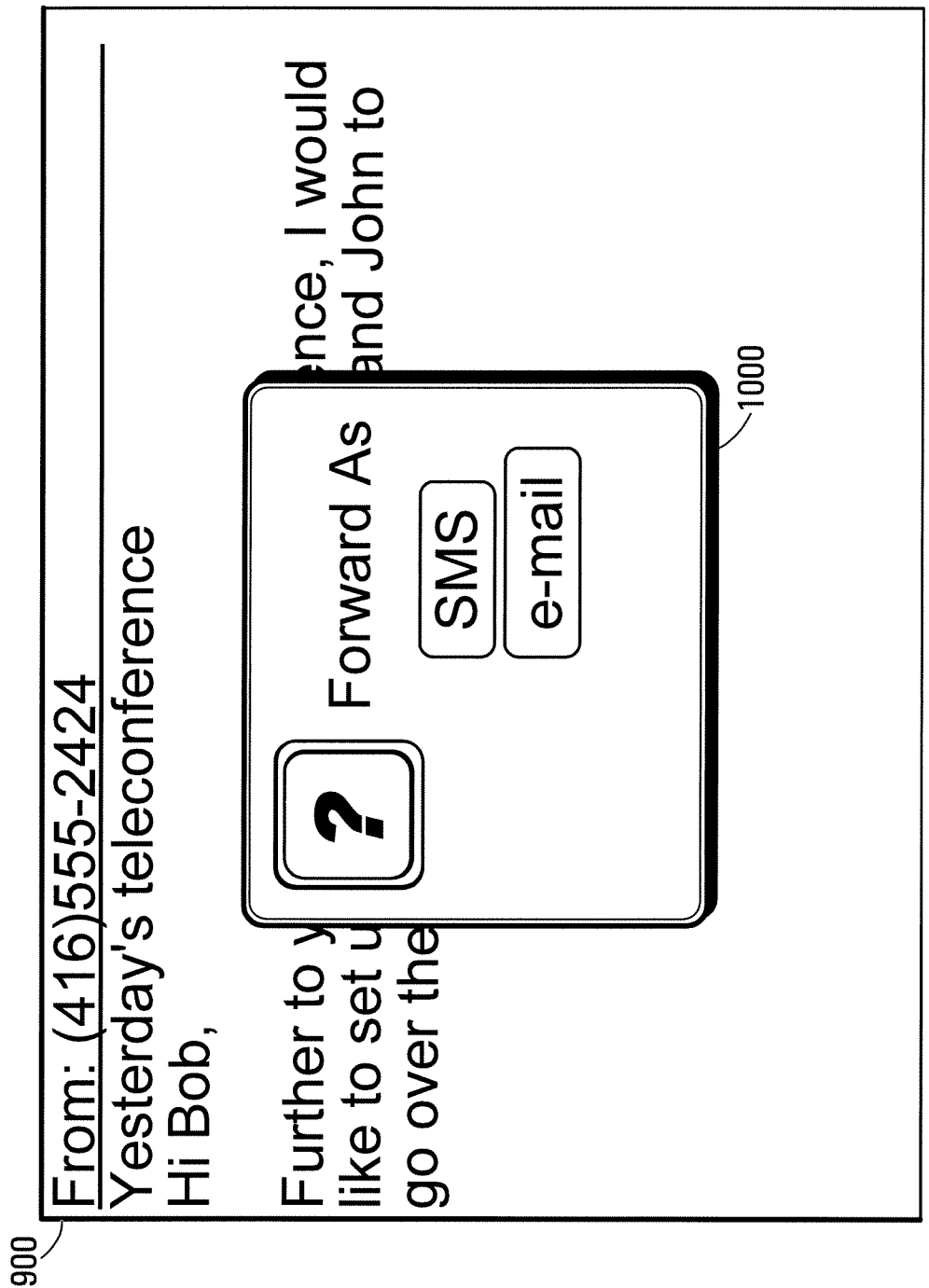
FIG. 10 illustrates the exemplary SMS message viewing user interface screen of FIG. 9 overlaid by a dialog according to an embodiment of the present application.

User selection of the Forward As menu item results, as discussed above, in instantiation of the Forward As verb object and the user interface object passing the given SMS donor message object to the Forward As verb object. The Forward As verb object, responsive to receiving the given SMS donor message object (step 401, FIG. 4) arranges the presentation (step 402) of a dialog object 1000, as illustrated in FIG. 10. The exemplary dialog object 1000 presents optional message types: e-mail; and SMS. An indication of a user selection of the e-mail message type is received (step 404) by the Forward As verb object. A method of the Forward As verb object may then pass (step 406) the received SMS donor message object to the e-mail Forward verb object.

The received SMS donor message object may be considered, by the e-mail Forward verb object, to be a donor message object without identity, since the e-mail Forward verb object does not need to perform any object type-specific processing on the donor message object. A method of the e-mail Forward verb object may construct an e-mail recipient message object (step 302) according, in part, to the e-mail message model class. A further method of the e-mail Forward verb object may then pass the received SMS donor message object to the e-mail recipient message object (step 304). A method of the e-mail recipient message object may request information elements from the received SMS donor message object for use in populating the e-mail recipient message object. A still further method of the e-mail Forward verb object may then spawn (step 306) an e-mail message editing screen object to the display 226, where the e-mail message editing screen object shows information elements from the e-mail recipient message object.

Figure 11:
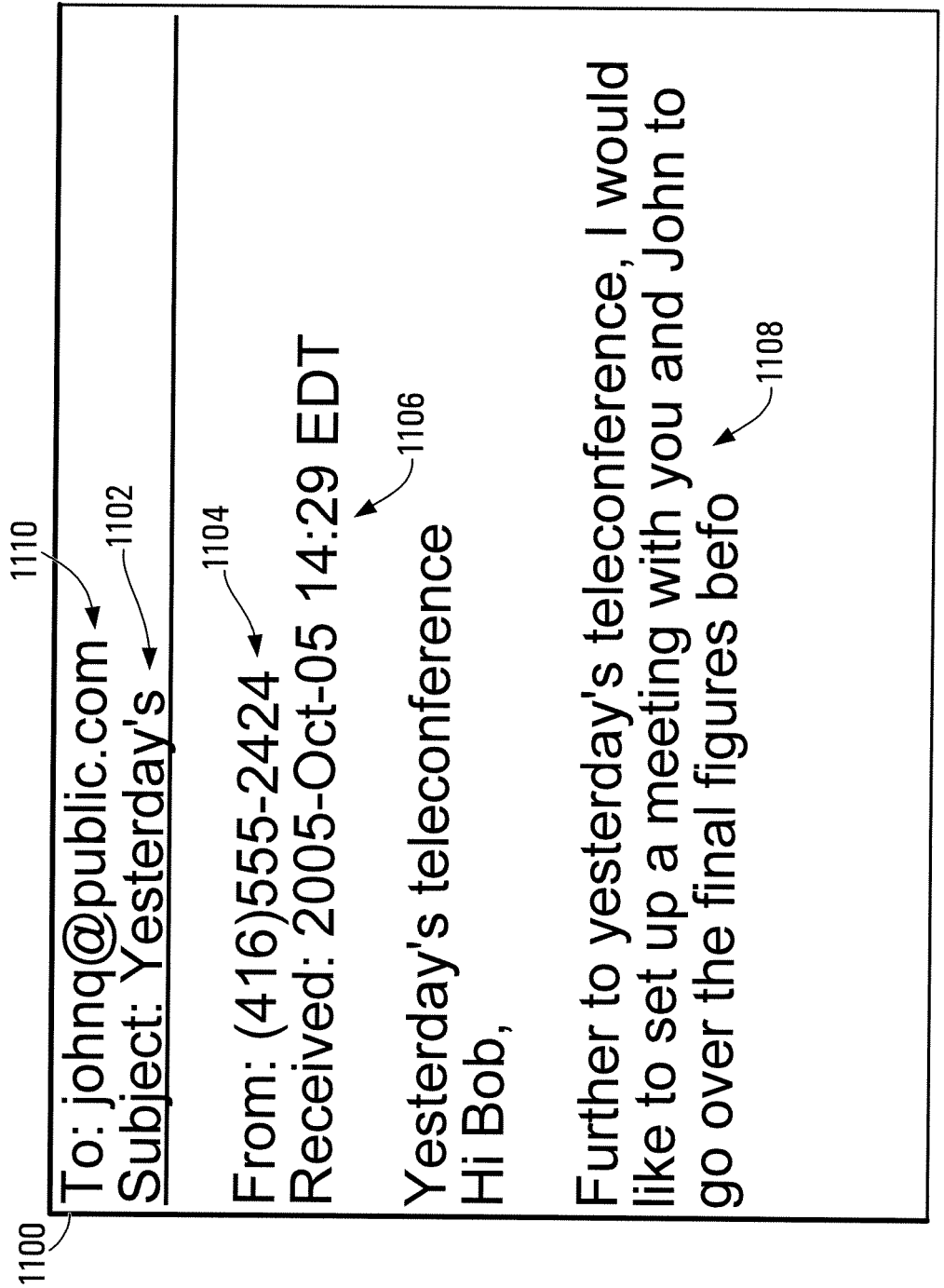
FIG. 11 illustrates an exemplary e-mail message composition user interface screen resulting from the selection of the e-mail option in the dialog of FIG. 10.

FIG. 11 illustrates an exemplary e-mail message editing screen object 1100 spawned by the still further method of the e-mail Forward verb object with information elements from the e-mail recipient message object based on responses from the received SMS donor message object, whose information elements are displayed in the exemplary SMS message viewing screen 900 of FIG. 9.

Initially, the e-mail recipient message object receives (step 801, FIG. 8) the received SMS donor message object. Before the method of the e-mail recipient message object requests information elements from the received SMS donor message object for use in populating the e-mail recipient message object, the method of the e-mail recipient message object may determine (step 802) whether the received SMS donor message object is of the same type as the recipient message object. If, as in this case, the type of the donor message object differs from the type of the recipient message object, the method of the e-mail recipient message object may determine (step 804) whether the received SMS donor message object implements the MessagePartsProvider interface. As in the case of the SMS recipient message object, the e-mail recipient object may request that the received SMS donor message object indicate whether the MessagePartsProvider interface is implemented. Upon determining that the received SMS donor message object does implement the MessagePartsProvider interface, the method of the e-mail recipient message object may request (step 806) several information elements (a Subject element; a Sender element; a Date Sent element; a Body element) from the received SMS donor message object via the MessagePartsProvider interface. The e-mail recipient message object may then receive (step 808) the requested information elements from the SMS donor message object. Using the received information elements, the e-mail recipient message object may populate itself (step 1816).

When the method of the e-mail recipient message object requests (step 806) the Subject element, in particular, from the received SMS donor message object via the MessagePartsProvider interface, the received SMS donor message object may process the Payload element to create a Subject element from a portion of the first 25 characters of the Payload element. Once the received SMS donor message object has created the Subject element, the received SMS donor message object may respond to the request from the e-mail recipient message object with the created Subject element.

The created Subject element may include characters up to a cut-off point, where the cut-off point is defined as: the first carriage return in the Payload element; the first period in the Payload element; the first exclamation mark in the Payload element; or the first question mark in the Payload element. If none of these exemplary cut-off characters are found, the cut-off point may be defined as the first comma the Payload element. If a comma character is not found, the cut-off point may be defined as the last white space before the 25-character point in the Payload element. If a white space is not found before the 25-character point, the cut-off point may be defined as the 25-character point itself.

Upon determining (step 804) that the received donor message object does not implement the MessagePartsProvider interface, the method of the e-mail recipient message object may end, since it may be considered that the does not have an appropriate interface to handle the donor message object.

Upon determining (step 802), in another case, that the received donor message object is of the same type as the recipient message object, the method of the e-mail recipient message object may request (step 812) information elements from the received donor message object using via an e-mail-specific interface. The e-mail recipient message object may then receive (step 814) the information elements from the received donor message object. Using the received information elements, the e-mail recipient message object may populate itself (step 816).

When the still further method of the e-mail Forward verb object spawns (step 306, FIG. 3) the exemplary e-mail message editing screen object 1100, a method of the exemplary e-mail message editing screen object 1100 may request the Body element from the e-mail recipient message object. The e-mail recipient message object may respond to the request with a Body element created through requests to the received SMS donor message object.

As illustrated in FIG. 11, the exemplary e-mail message editing screen object 1100 includes a Body element as supplied by the e-mail recipient message object. The Body element is illustrated as formed from a Sender element 1104, a Date Sent element 1106 and a Payload element 1108. The exemplary e-mail message editing screen object 1100 also includes a Subject element 1102 as supplied by the e-mail recipient message object.

The exemplary e-mail message editing screen object 1100 allows a user to provide an e-mail destination address 1110 for the e-mail recipient message object.

As will be understood by a person of ordinary skill in the art, although the above description provides, as exemplary message handling services, the known SMS transport mechanism and the known e-mail message transport mechanism, aspects of the present application may be applicable for several other message handling services such as those message handling services concerned with handling pages composed in a markup language, facsimile messages, IM messages, voice mail messages, Address Book-based messages or Calendar-based messages. Additionally, the known Multimedia Messaging Service (MMS) is a further exemplary message handling service that may be seen as an extension of the SMS transport mechanism. MMS currently provides for transmission, from a wireless mobile communication device, of up to 100 kilobytes of data, such as text, short musical pieces, digital still images and brief digital video sequences. Additionally, often mobile device manufacturers or service providers may offer proprietary mobile device-to-mobile device transport mechanisms.

FIGS. 12 to 21 illustrate alternative user interface screens that may be presented by an embodiment of the present disclosure. These user interface screens are an alternative to the screens illustrated in FIGS. 5 to 7. The illustrated user interface screens may appear sequentially when a message of a first type received over a first message handling service, such as an e-mail message, is being forwarded as a message of a second type over a second message handling service such as an SMS message.

Figure 12:
FIG. 12 illustrates a user interface screen which presents a message list from which individual e-mail messages may be selected for forwarding.

Referring to FIG. 12, user interface screen 1200 displayed by mobile communication device 101A presents a message list 1202. Each row in the message list 1202 represents a message that has either been received by device 101 or sent by device 101A. That is, the list 1202 is a unified message list showing messages from an "inbox" folder as well as a "sent items" folder, in an interleaved fashion. All of the messages represented in the message list 1202 of FIG. 12 are e-mail messages. However, it is possible that other types of messages, such as IM messages, peer-to-peer messages (such as so-called "PIN messages", which are like e-mail messages but do not travel through an e-mail server, and which are so named because they are transmitted directly to another network device 101 based on a unique device Personal Identification Number or PIN of the device), SMS messages, MMS message, or the like, could be represented in the unified message list 1202. Each message represented in message list 1202 has an associated icon which provides information regarding one or more characteristics of the e-mail message represented by the row. For example, a checkmark icon indicates that the e-mail message represented by the row is an outgoing e-mail message which has been successfully sent. An envelope icon indicates a received e-mail message. An envelope icon with an overlaid paper clip symbol indicates a received e-mail message with at least one attachment.

Figure 13:
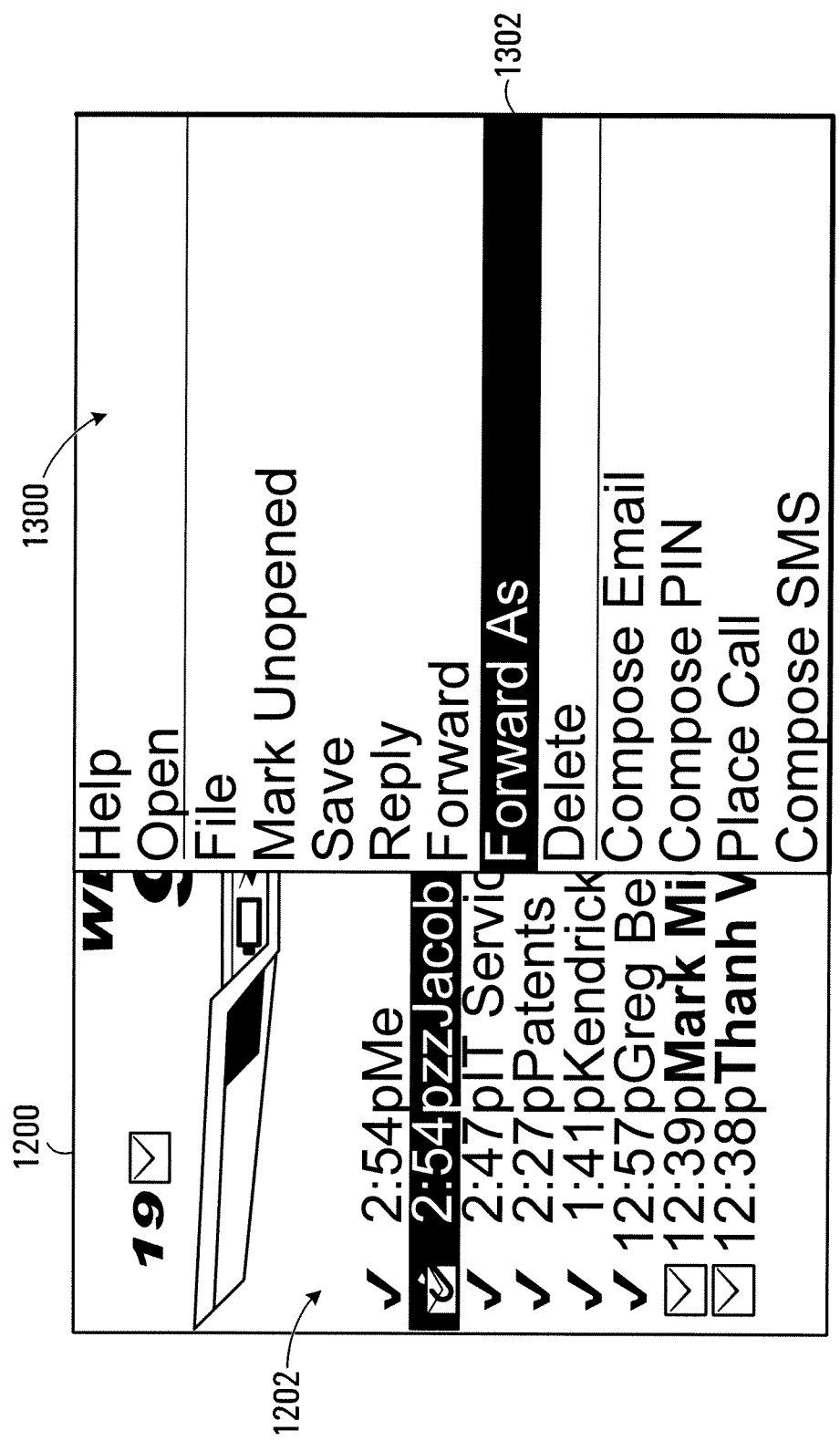
FIG. 13 illustrates the user interface screen of FIG. 12 with an overlaid menu in which a menu item for forwarding a selected e-mail message as another type of message has been selected.

In FIG. 12, the second message in the message list 1202 is highlighted (shown in reverse video). This indicates that a user of mobile communication device 101 A may select the e-mail message represented by that row, e.g. through manipulation of a track wheel or keyboard for example. The user then interacts with the device 101A to cause a menu 1300 to be displayed, as illustrated in FIG. 13. Menu 1300 contains selectable options (menu items) representing actions that can be taken in respect of the selected e-mail message. The user scrolls to the "Forward As" menu item 1302, causing it to be highlighted as shown in FIG. 13, and then selects the menu item 1302.

Figure 14:
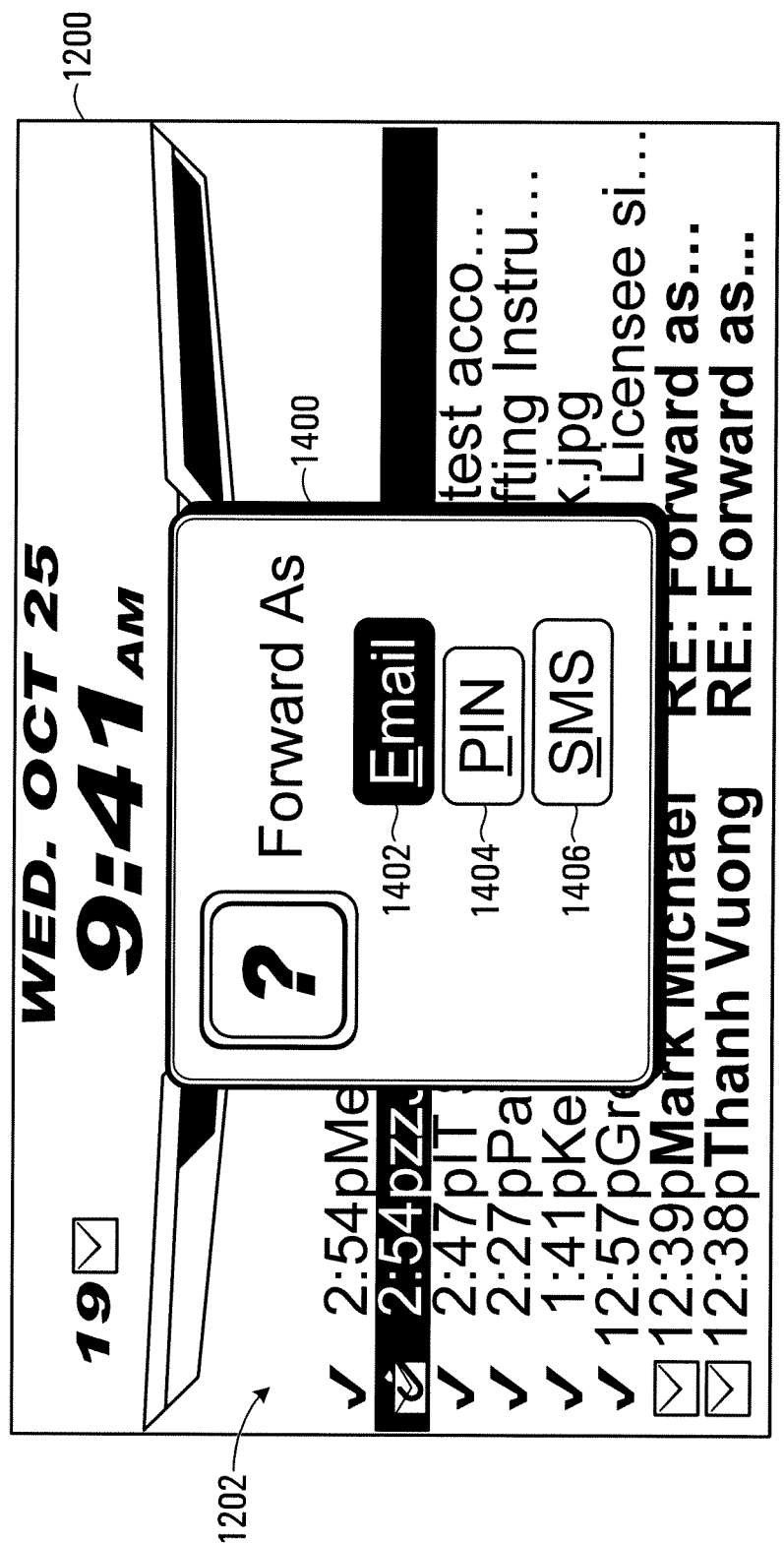
FIG. 14 illustrates the user interface screen of FIG. 12 with an overlaid dialog box presenting selectable options representing various possible message types for the message to be forwarded.

Upon user selection of menu item 1302, a "Forward As" dialog box 1400 appears over top of the message list 1202 as shown in FIG. 14. The dialog box 1400 contains three options (buttons) 1402,1404 and 1406 representing three different types of message as which the selected e-mail message may be forwarded. In the present example, the user may forward the selected e-mail message as an e-mail message, a PIN message, or an SMS message, by selecting button 1402,1404 or 1406, respectively.

Figure 15:
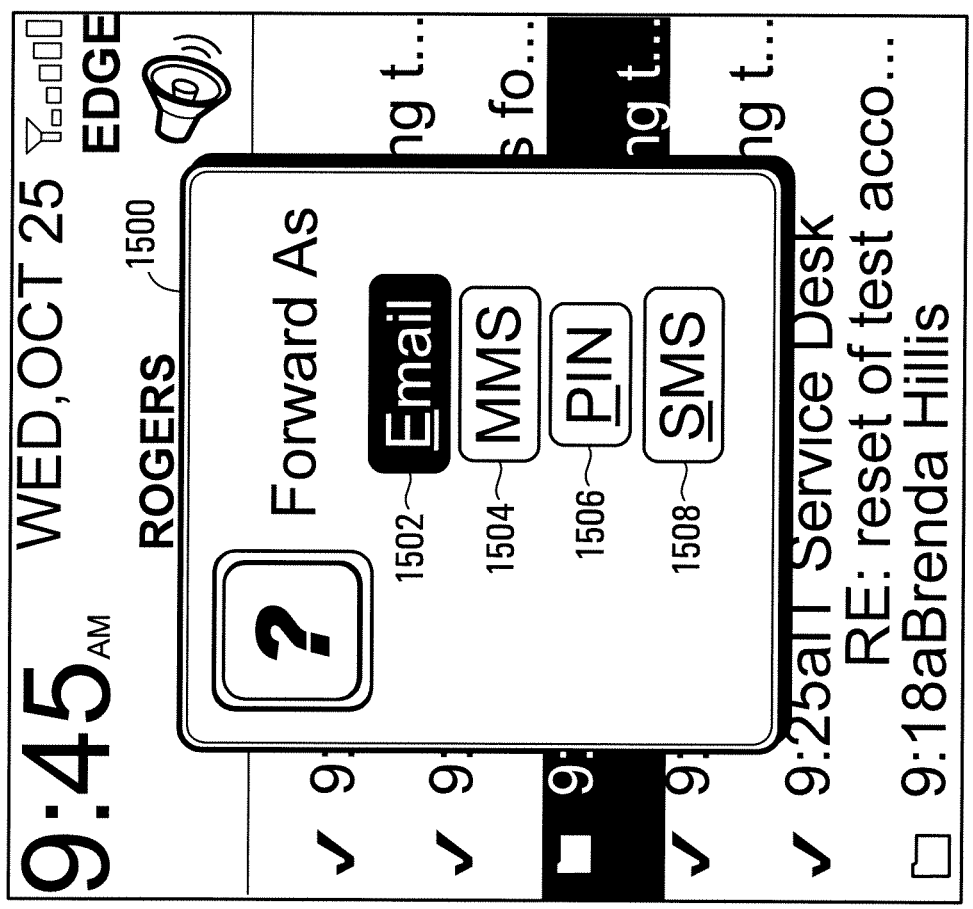
FIG. 15 illustrates the user interface screen of FIG. 14 following user selection of the SMS message type option.

In alternative embodiments, the set of different message types as which a selected message may be forwarded may be different. For example, FIG. 15 illustrates an alternative dialog box 1500 containing four buttons 1502,1504, 1506, and 1508, whose selection indicates a desire to forward a selected message as an e-mail message, an MMS message, a PIN message, or an SMS message, respectively.

Further embodiments of this solution may exist in which different communication message types are associated with various other forms of voice and/or data communications methods such as instant messaging, voice memos, location based messaging, podcasting, weblogs, etc. Furthermore, selection of message types and display of message types as options in a user interface, such as in dialog box 1400, may also dynamically change based on the methods of communications available for that contact. For example, if a user only has e-mail and SMS capability to contact a desired recipient, only those two choices may appear. In contrast, if the user is capable of contacting the desired recipient via e-mail, SMS, MMS and IM alias, then four options representing these four modes of communication (message types) would appear.

Figure 16:
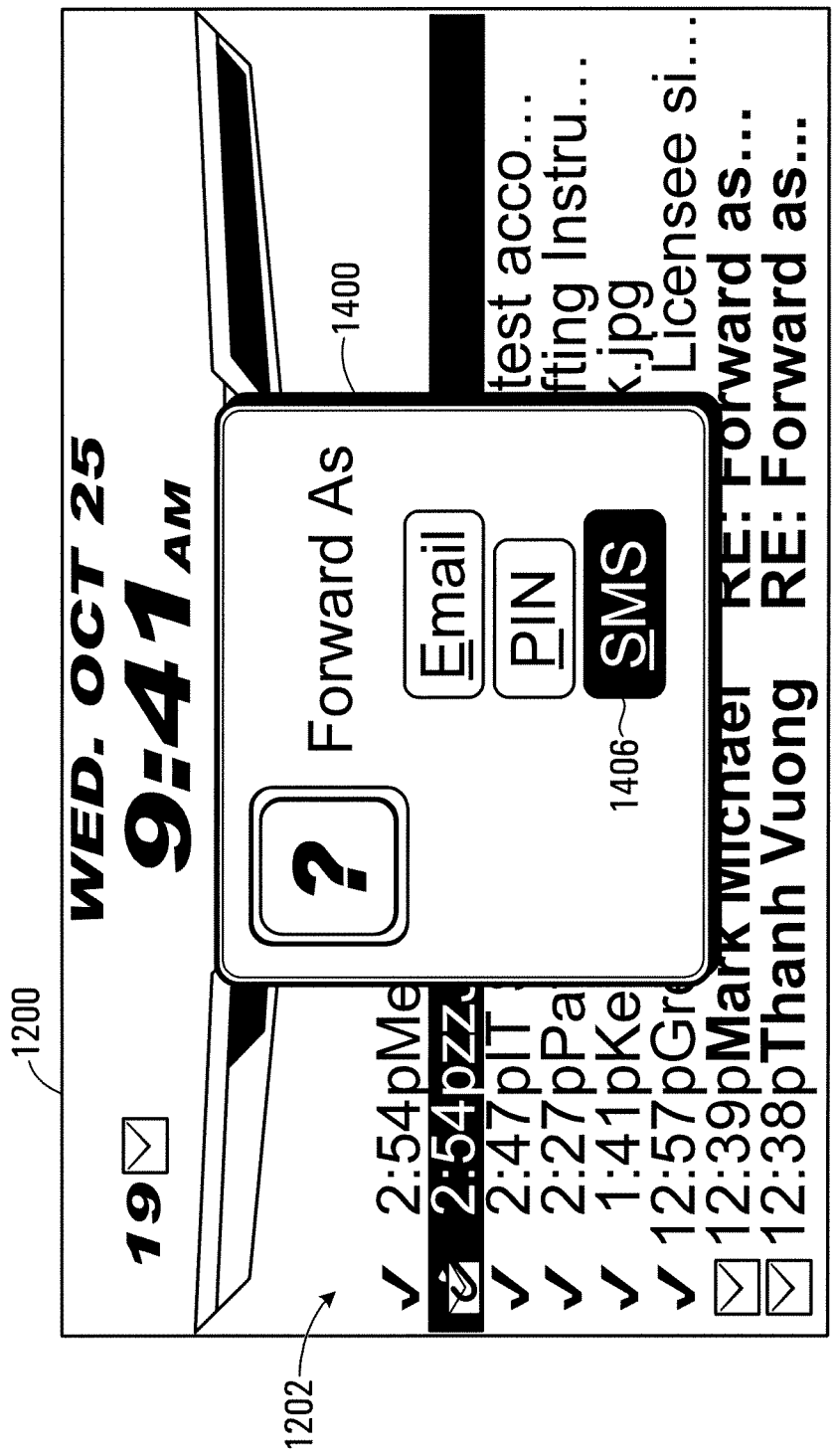
FIG. 16 illustrates an alternative user interface screen to that illustrated in FIG. 14 showing a different set of possible message type options in the dialog box.

Referring back to the dialog box 1400 FIG. 14, it is assumed that the user selects button 1406 to indicate a desire to forward the selected e-mail message as an SMS message. The selection of button 1406 is shown in FIG. 16.

Figure 17:
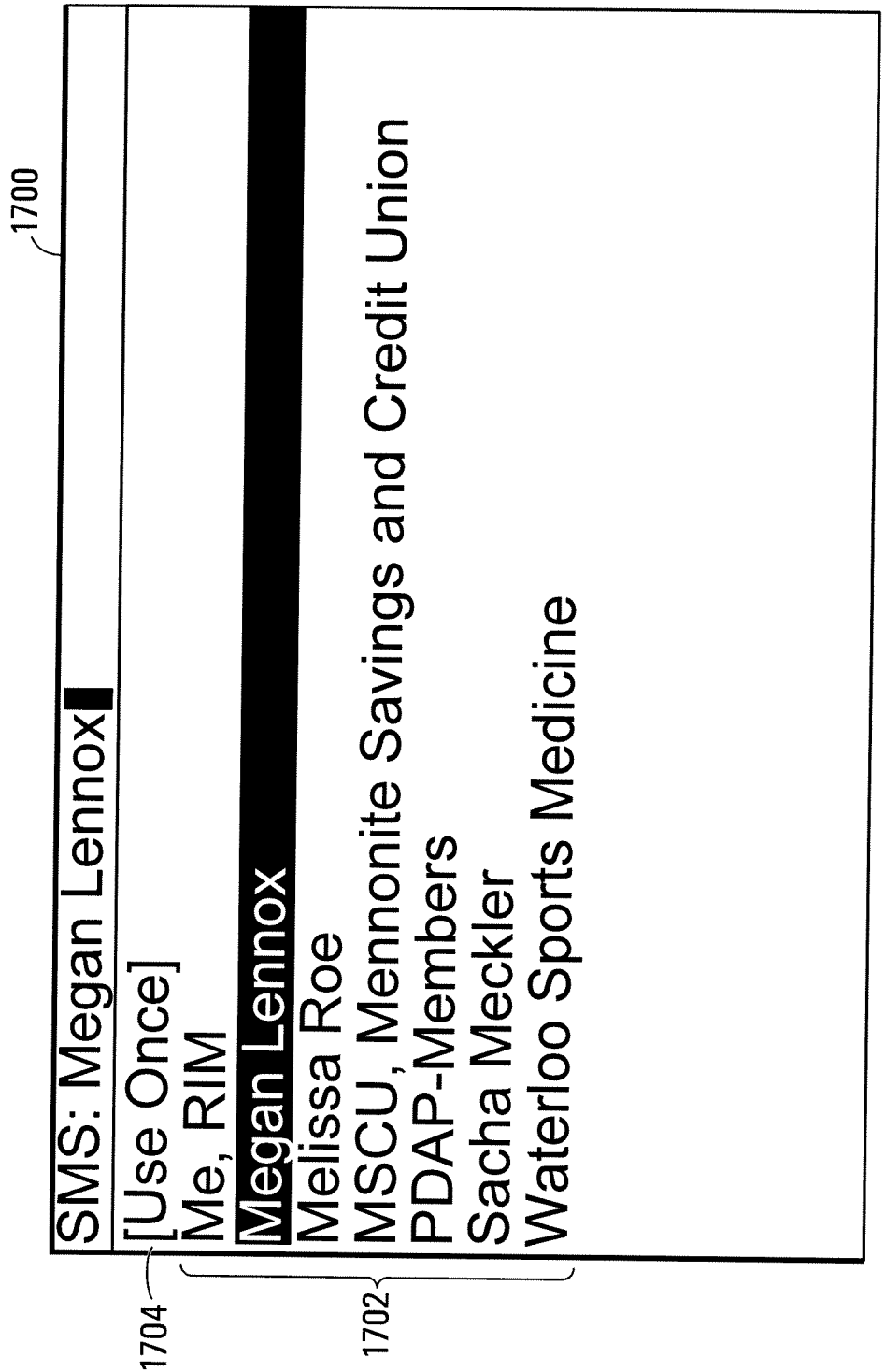
FIG. 17 illustrates a user interface screen which presents an electronic address book from which a desired SMS message recipient has been selected.
Figure 18:
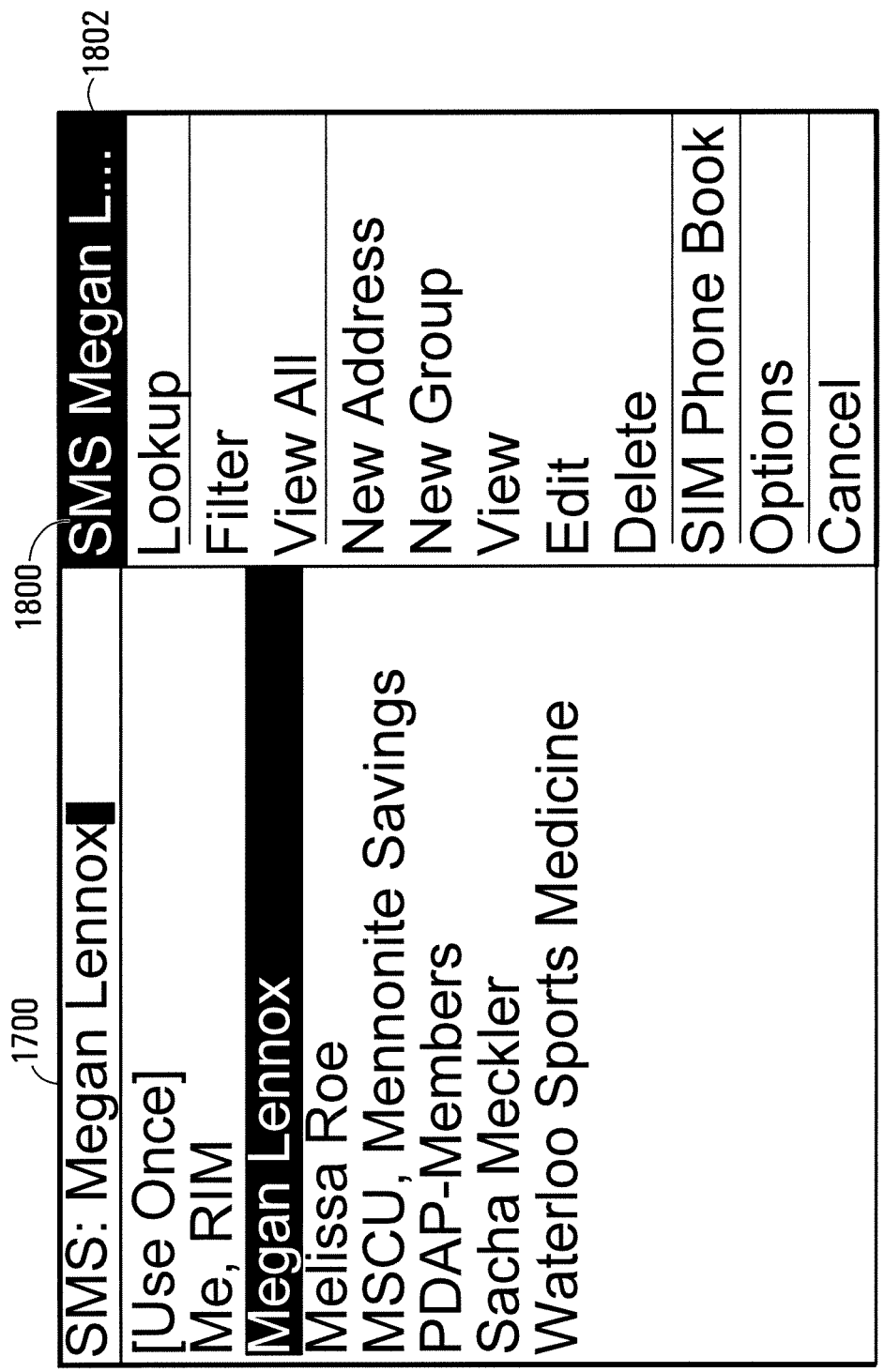
FIG. 18 illustrates the user interface screen of FIG. 17 with an overlaid menu.

Upon user selection of button 1406, the user interface screen 1700 of FIG. 17 is displayed. Screen 1700 presents an electronic address book 1702. Each row in the address book 1702 represents a single contact within the address book. Each contact has various contact information associated therewith, stored in a database of device 101A (not shown), such as address, work telephone, home telephone, mobile telephone, fax number, e-mail address, URL, and other information associated with the contact. The [Use Once] entry 1704 of FIG. 17 is not part of the address book 1 702, but rather is for selection by a user if it is desired to enter a desired recipient on a one-off basis. The user selects one the first row of address book 1702 to specify a desired recipient, whose name is Megan Lennox, for the forwarded message. The user then interacts with the device 101A to cause a menu 1800 to be displayed over top of the user interface screen 1700, as shown in FIG. 18.

Menu 1800 contains selectable menu items representing actions that can be taken in respect of the selected contact. In the present example, the user has selected the "SMS Megan Lennox" menu item 1802, as indicated by the highlighting shown in FIG. 18. This action is for selecting the contact to whom to forward the message.

Figure 19:
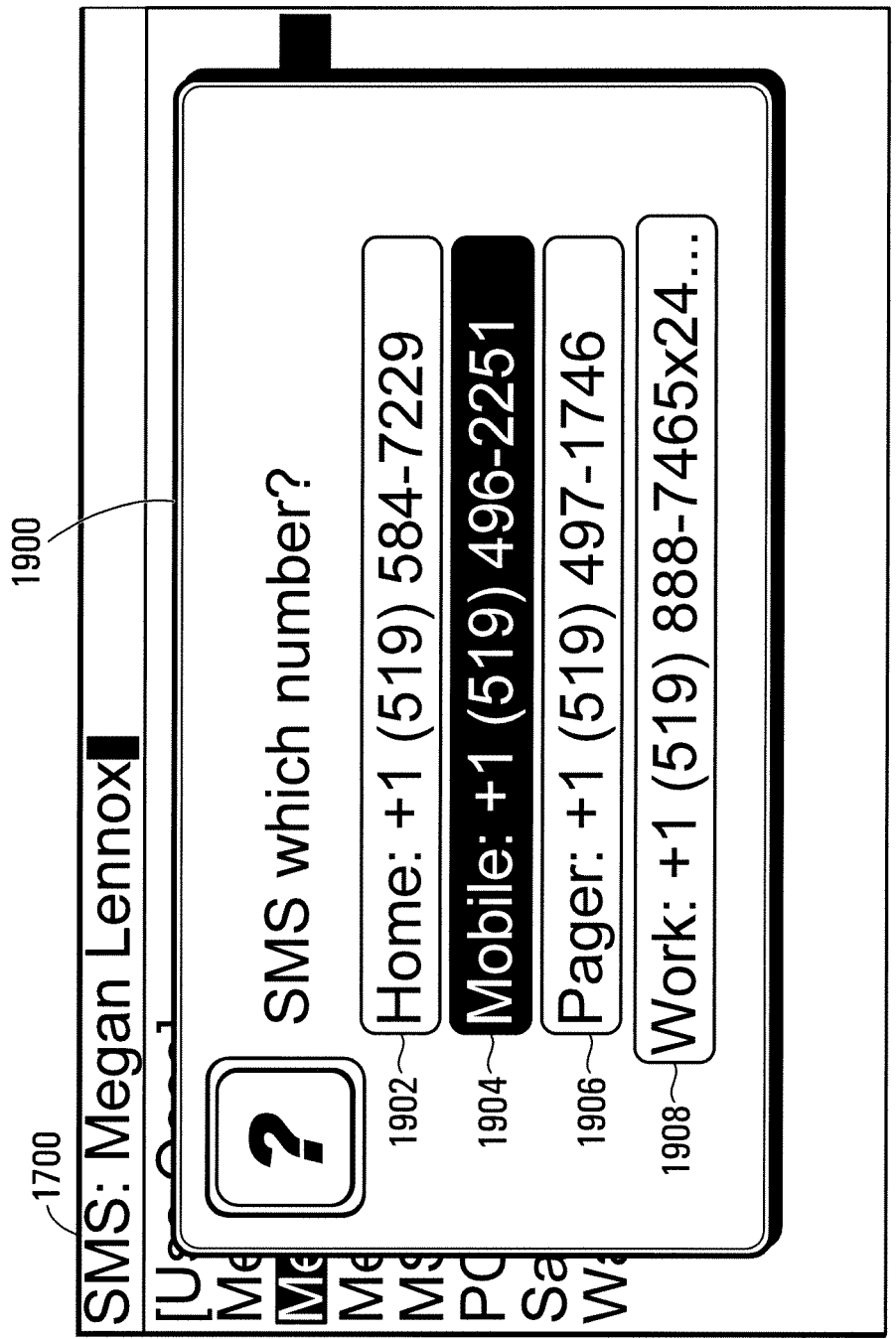
FIG. 19 illustrates the user interface screen of FIG. 17 with an overlaid dialog box presenting multiple selectable destination address options associated with the desired SMS message recipient.

Upon user selection of menu item 1802, an "SMS which number?" dialog box 1900 appears as shown in FIG. 19. The purpose of dialog box 1900 is to present a plurality of selectable destination addresses associated with the desired recipient to which the previously selected e-mail message may be forwarded as an SMS message. In the illustrated example, four selectable SMS destination addresses (telephone numbers) are displayed in the form of four buttons 1902, 1904, 1906 and 1908. These buttons represent four different types of telephone numbers—specifically, a home number, a mobile device number, a pager number, and a work number—associated with the previously selected desired recipient, Megan Lennox.

In alternative embodiments the network may support the sending of SMS messages as e-mail messages. That is, the network may permit an SMS message to be addressed with an e-mail address. In such embodiments, a modified representation of the dialog box of FIG. 19 (not shown) would include options to allow the SMS to be addressed the desired recipient's e-mail address, or, if more than one address is assigned to the desired recipient, one of those addresses. If one of those e-mail addresses is likely more suitable than the others for receiving the message, then that e-mail address may be automatically selected by default.

Because the e-mail message is being forwarded as an SMS message, and because mobile devices are typically the most likely to be SMS-capable, the telephone number associated with a mobile device is automatically selected as the default destination address, as indicated by the highlighting of button 1904 in FIG. 19. The mobile device 101A may identify a number as a mobile device number by the fact that the number was retrieved from a mobile device telephone number field of the database, for example. Alternatively, a characteristic of the telephone number, such as an area code, may be used to determine that the number is associated with a mobile communication device. Those skilled in the art will appreciate that many approaches may exist for distinguishing a mobile device number from other types of telephone numbers, and more generally, for distinguishing a preferred type of destination address for a forwarded message from other types of destination addresses. Whatever the method used, the default selection of the telephone number that is most likely to be SMS-capable relieves the user from the burden of scrolling down a set of options within dialog box 1900 to select that number every time a message is forwarded as an SMS message.

Figure 20:
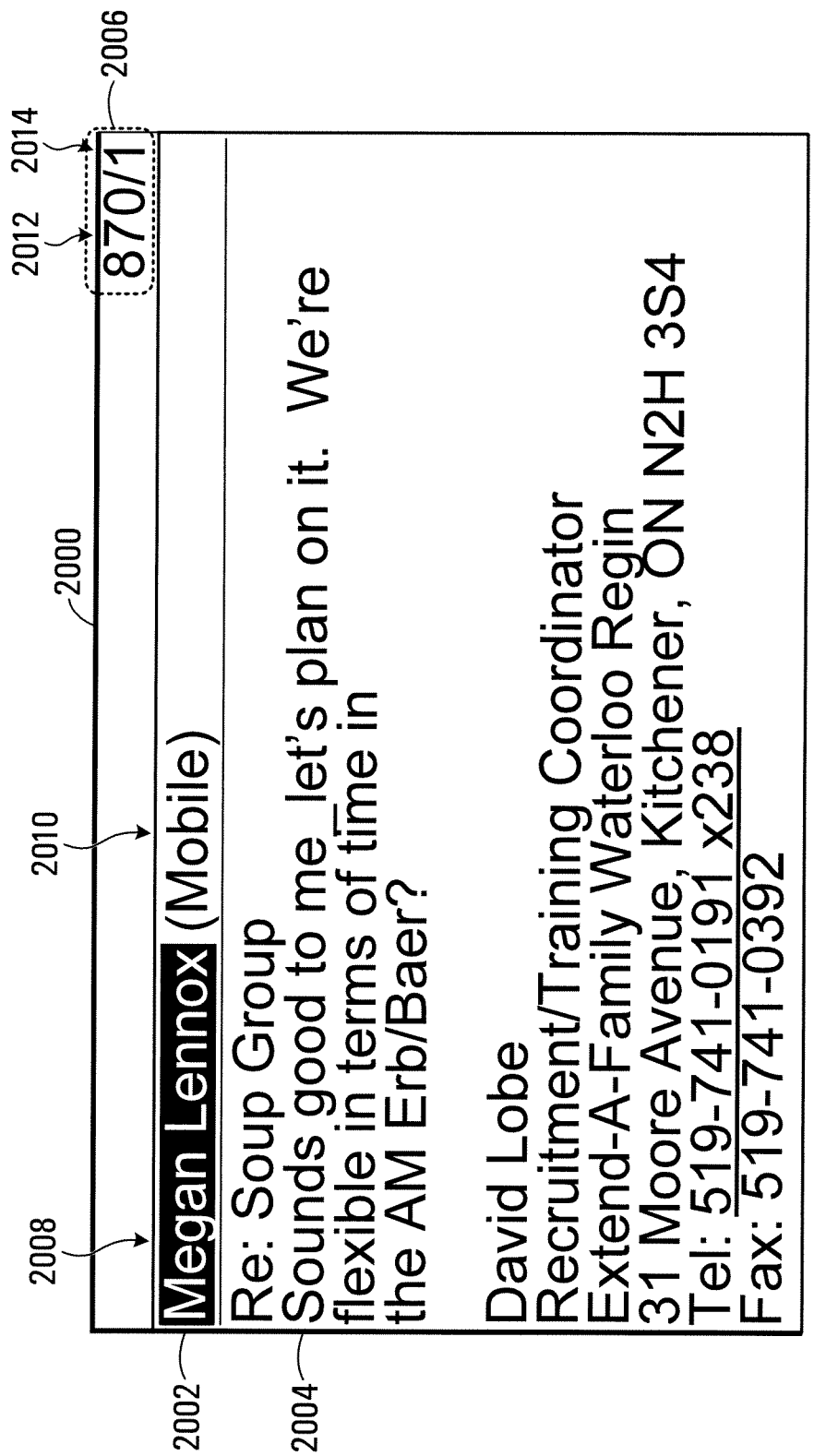
FIG. 20 illustrates a user interface screen for presenting various information regarding a message being forwarded as an SMS message.

Upon user selection of button 1904, the user interface screen 2000 of FIG. 20 is displayed. User interface screen 2000 contains a representation of the previously selected e-mail message has converted to an SMS message by software or firmware executing at device 101A. The fields of the user interface screen 2000 include an SMS destination address field 2002, an SMS message body field 2004 and a message size indicator field 2006.

SMS destination address field 2002 has two components, namely, a recipient name field 2008 and destination address type label 2010. The recipient name field is the name of the contact selected from the address book 1702 of FIG. 17, as previously described. The desired destination address type label 2010 parenthetically identifies the type of destination address selected by the user from dialog box 1900 of FIG. 19. By identifying the desired recipient by name and by indicating the type of destination address (which destination address is, in the case of SMS messages, a telephone number), rather than merely identifying the destination address as a telephone number as shown in FIG. 7 at 702, a user is relieved from the burden of having to recall whose numbers being displayed and the type of number (e.g., work, mobile, home, etc.) and instead is presented with an easily readable indicator of the destination address. This promotes improved or faster user comprehension of the presented information. In the illustrated embodiment, the type label 2010 is "(Mobile)". In alternative embodiments, the type label could be another label, such as "(Cellular)", "(Cell)" or "(PDA)" (abbreviation of Personal Digital Assistant) for example. The parentheses are optional. Alternatively, an icon representing a mobile communication device could be displayed.

The SMS message body field 2004 contains the body of the SMS message to be sent, which includes the original e-mail message subject line and body. In the present example, it is assumed that the length of the created SMS message of FIG. 20 is 90 characters.

The message size indicator field 2006 has two components, namely, a remaining characters count field 2012 and an SMS segment count field 2014.

To best appreciate the purpose of the remaining characters count field 2012, it should be recognized that governing SMS protocol standards impose a maximum length upon a single SMS message, as previously noted. In the present example, it is assumed that the maximum length for an SMS message is 160 characters in accordance with current GSM standards. When it is desired to send an SMS message that is larger than 160 characters, the SMS message is broken into multiple parts, known as "segments", which are sent in sequence. However, governing protocols may also set a maximum number of segments into which a large message may be broken. In the present embodiment, the maximum number of segments is assumed to be six. Thus the maximum total length of an SMS message that is being sent as six segments is 960 characters (160 characters * 6 segments =960 characters). Bearing this in mind, and referring back to FIG. 20, the remaining characters count field 2012 indicates how many characters out of the maximum total number of 960 characters are unused in the outgoing message. In the illustrated example, in which the SMS message to be sent is assumed to be 90 characters in length, the remaining characters count of FIG. 20 is 870 (960−90=870).

The SMS segment count field 2014, on the other hand, indicates the number of segments that are required to transmit the outgoing SMS message. In the present example, the length of the SMS message to be sent, i.e. 90 characters, is less than the maximum size of 160 characters for a single SMS message segment. As a result, it is only necessary to use a single segment to send the message. This is reflected by the number "1" displayed in field 2014.

Figure 21:
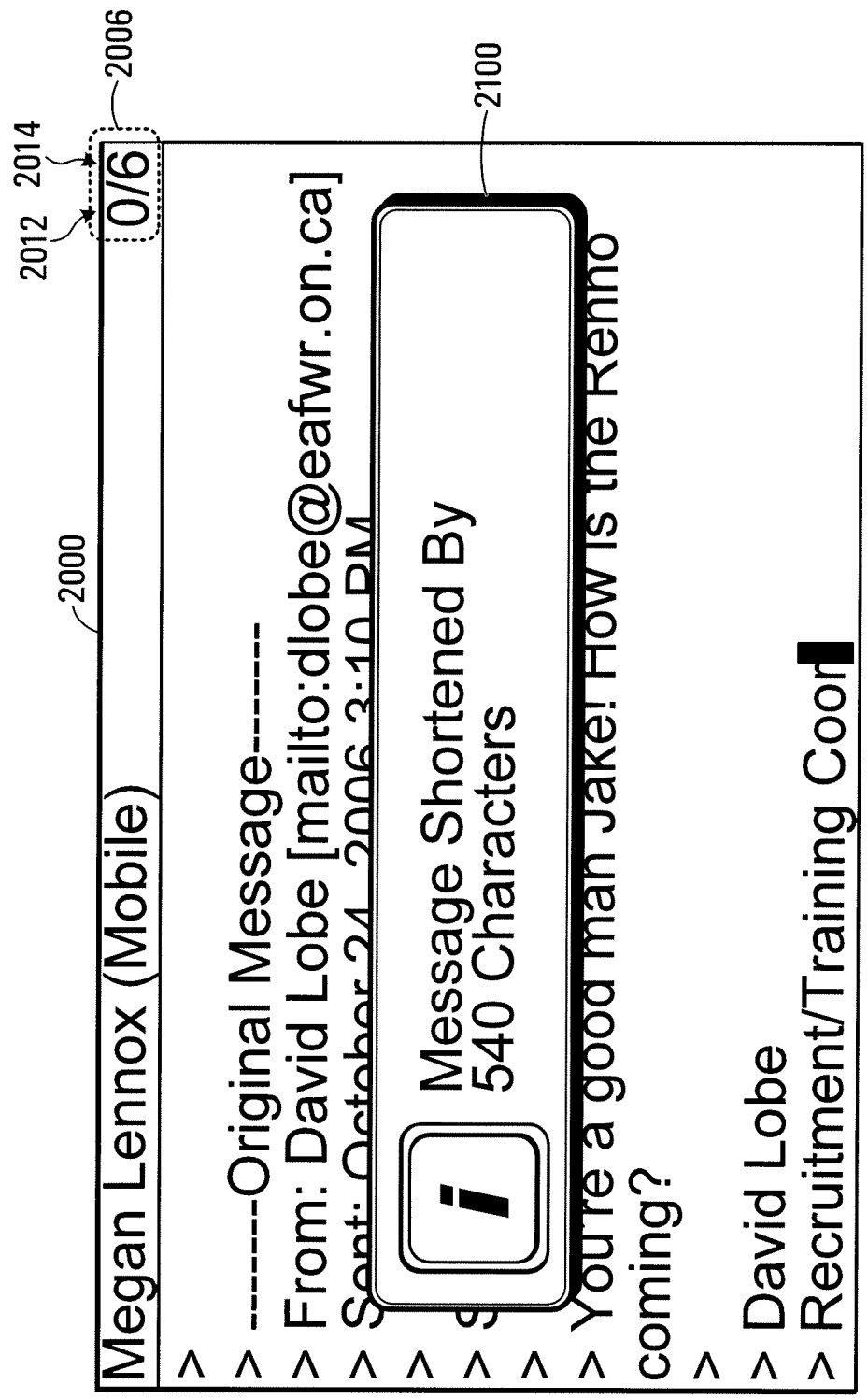
FIG. 21 illustrates a user interface screen for presenting various information regarding a message that is being forwarded as an SMS message showing an overlaid dialog box indicating that the SMS message has been truncated.

It is of course possible that a lengthy e-mail message, if converted to an SMS message, would exceed the maximum total length of 960 characters. This scenario is illustrated in FIG. 21. In the illustrated example, the same user interface screen 2000 as was shown in FIG. 20 is used to present information regarding the lengthy SMS message to be sent. It is assumed that conversion of the received e-mail message to an SMS message would result in an SMS message having an overall length of 1500 characters. In this case, it is necessary to send the SMS message as six separate segments, as indicated by the number "6" in SMS segment count field 2014. It is noted that each of these segments will be completely full (i.e. will contain 160 characters of information). Any characters of the 1500 beyond the first 960 characters are truncated. The user is apprised of the number of truncated characters by dialog box 2100. Moreover, because no additional characters may be added (since the maximum length has been reached), the remaining characters count field 2012 indicates "0". Any attachments to the original e-mail message may be stripped (i.e. may not form part of the outgoing SMS message), as the recipient message transport may not accept donor message components.

As should now be appreciated, the presentation of the recipient name, destination address type label, and message size indicator field on a single user interface screen along with outgoing message content, provides a convenient, "at-a-glance" reference for a user forwarding a message from device 101A.

As will be appreciated by those ordinarily skilled in the art, the user interface screens of FIGS. 12-21 may be implemented by software executing at the mobile communication device 101A. This software may be stored in flash memory 216 (a form of computer or machine-readable medium), and may be part of one or more of the illustrated software modules 230B, 230C and 230D, or alternatively may form part of a separate software, firmware or hardware module at the device 101A.

In some embodiments, prior to the presentation of dialog box 2100, another dialog box (or other mechanism for presenting information to the user of mobile communication device 101A) may be presented to expressly notify the user that the outgoing SMS message is being broken up into multiple segments (or, more generally, that an outgoing message is being transmitted in multiple parts).

Other modifications will be apparent to those skilled in the art and, therefore, the invention is defined in the claims.

What is claimed is:

1. A method comprising:
receiving an indication that a received electronic mail (e-mail) message should be forwarded as a Short Message Service (SMS) message;
further receiving an indication of a specified recipient for the SMS message, the indication comprising a user selection, from a displayed list of names of contacts in an electronic address book, of a name of a contact of the electronic address book;
presenting a user interface including a plurality of selectable destination addresses for the SMS message, each of the destination addresses being associated with the contact of the electronic address book;
based upon determining that a destination address of the plurality is associated with a mobile communication device, automatically selecting within the user interface, as a default destination address for the SMS message, the destination address associated with the mobile communication device;
ascertaining whether the e-mail message, when converted to an SMS message, would exceed a predetermined maximum total length L for a multi-segment SMS message, the predetermined maximum total length L being based on a predetermined maximum number of characters per segment multiplied by a predetermined maximum number of segments per multi-segment SMS message;
when the ascertaining is in the positive, creating a multi-segment SMS message comprising the predetermined maximum number of segments, each of the SMS message segments containing a portion of the content of the e-mail message and having a length that is equal to the maximum number of characters per segment;
displaying in the user interface a number of segments in the created multi-segment SMS message that is equal to the predetermined maximum number of segments; and
further displaying in the user interface an indicator of a number of characters by which the e-mail message has been shortened.

2. The method of claim 1 further comprising:
upon user selection of a desired destination address from the plurality of selectable destination addresses, displaying on a single user interface screen:
a name of the specified recipient;
a type of the desired destination address; and
at least part of a body of the e-mail message.

3. The method of claim 2 wherein the type of the desired destination address is a label indicating that the destination address represents a mobile communication device.

4. The method of claim 1 further comprising:
further displaying in the user interface an indicator of a difference between an actual length of the multi-segment SMS message and the predetermined maximum total length L, wherein the indicator of the difference indicates zero.

5. A non-transitory computer-readable medium storing instructions which, when executed by at least one processor of a computing device, adapt the device to:
receive an indication that an electronic mail (e-mail) message should be forwarded as a Short Message Service (SMS) message;
further receive an indication of a specified recipient for the SMS message, the indication comprising a user selection, from a displayed list of names of contacts in an electronic address book, of a name of a contact of the electronic address book;
present a user interface including a plurality of selectable destination addresses for the SMS message, each of the destination addresses being associated with the contact of the electronic address book;
based upon determining that a destination address of the plurality is associated with a mobile communication device, automatically select within the user interface, as a default destination address for the SMS message, the destination address associated with the mobile communication device;
ascertain whether the e-mail message, when converted to an SMS message, would exceed a predetermined maximum total length L for a multi-segment SMS message, the predetermined maximum total length L being based on a predetermined maximum number of characters per segment multiplied by a predetermined maximum number of segments per multi-segment SMS message;
when the ascertaining is in the positive, create a multi-segment SMS message comprising the predetermined maximum number of segments, each of the SMS message segments containing a portion of the content of the e-mail message and having a length that is equal to the maximum number of characters per segment;
display in the user interface a number of segments in the created multi-segment SMS message that is equal to the predetermined maximum number of segments; and
further display in the user interface an indicator of a number of characters by which the e-mail message has been shortened.

6. A computing device having at least one processor and memory in communication with the at least one processor, the memory storing instructions which, when executed by the at least one processor, adapt the device to:
receive an indication that an electronic mail (e-mail) message should be forwarded as a Short Message Service (SMS) message;
further receive an indication of a specified recipient for the SMS message, the indication comprising a user selection, from a displayed list of names of contacts in an electronic address book, of a name of a contact of the electronic address book;
present a user interface including a plurality of selectable destination addresses for the SMS message, each of the destination addresses being associated with the contact of the electronic address book;

based upon determining that a destination address of the plurality is associated with a mobile communication device, automatically set a default destination address for the SMS message to be the destination address;

ascertain whether the e-mail message, when converted to an SMS message, would exceed a predetermined maximum total length L for a multi-segment SMS message, the predetermined maximum total length L being based on a predetermined maximum number of characters per segment multiplied by a predetermined maximum number of segments per multi-segment SMS message;

when the ascertaining is in the positive, create a multi-segment SMS message comprising the predetermined maximum number of segments, each of the SMS message segments containing a portion of the content of the e-mail message and having a length that is equal to the maximum number of characters per segment;

display in the user interface a number of segments in the created multi-segment SMS message that is equal to the predetermined maximum number of segments; and further display in the user interface an indicator of a number of characters by which the e-mail message has been shortened.

7. A method comprising:

receiving a first message, of a first type, over a first message handling service;

receiving an indication that the message should be forwarded as a second message, of a second type, over a second message handling service different from the first message handling service;

further receiving an indication of a specified recipient for the second message, the indication comprising a user selection, from a displayed list of names of contacts in an electronic address book, of a name of a contact of the electronic address book;

displaying a user interface including a plurality of selectable destination addresses for the second message, each of the destination addresses being associated with the contact of the electronic address book;

based upon determining that a destination address of the plurality is associated with a device that is more suitable for receiving the second type of message than any device associated with any remaining destination addresses of the plurality, automatically selecting within the displayed user interface, as a default destination address for the second message, the destination address associated with the mobile communication device;

ascertain whether the first message, if converted to a message of the second type, would exceed a predetermined maximum total length L for a multi-segment message of the second type, the predetermined maximum total length L being based on a predetermined maximum number of characters per segment multiplied by a predetermined maximum number of segments per multi-segment message;

when the ascertaining is in the positive, create a multi-segment message of the second type comprising the predetermined maximum number of segments, each of the message segments containing a portion of the content of the first message and having a length that is equal to the maximum number of characters per segment;

display in the user interface a number of segments in the created multi-segment message that is equal to the predetermined maximum number of segments; and further display in the user interface an indicator of a number of characters by which the first message has been shortened.

8. The method of claim 7 wherein the second message handling service is a Short Message Service (SMS) message handling service.

9. The method of claim 7 wherein the second message handling service is a Multimedia Message Service (MMS) message handling service.

10. The method of claim 7 wherein the second message handling service is a peer-to-peer message handling service.

11. The method of claim 7 further comprising:

upon user selection of a desired destination address from the plurality of selectable destination addresses, displaying on a single user interface screen:

a name of the specified recipient;

a type of the desired destination address; and at least part of a body of the first message.

12. A method comprising:

receiving an e-mail message over an electronic mail (e-mail) message handling service;

receiving an indication that the e-mail message should be forwarded as a Short Message Service (SMS) message over an SMS message handling service;

ascertaining whether the e-mail message, when converted to an SMS message, would exceed a predetermined maximum total length L for a multi-segment SMS message, the predetermined maximum total length L being based on a predetermined maximum number of characters per segment multiplied by a predetermined maximum number of segments per multi-segment SMS message;

if the ascertaining is in the positive, displaying in a user interface an indicator of a number of segments in the multi-segment SMS message that is equal to the predetermined maximum number of segments per multi-segment SMS message; and further display in the user interface an indicator of a number of characters, in excess of the predetermined maximum total length L for a multi-segment SMS message, by which the e-mail message has been shortened.

13. The method claim 1 wherein the name of the contact comprises a first name and a surname.

14. A non-transitory computer-readable medium storing instructions which, when executed by at least one processor of a computing device, adapt the device to:

receive an e-mail message over an electronic mail (e-mail) message handling service;

receive an indication that the e-mail message should be forwarded as a Short Message Service (SMS) message over an SMS message handling service;

ascertain whether the e-mail message, when converted to an SMS message, would exceed a predetermined maximum total length L for a multi-segment SMS message, the predetermined maximum total length L being based on a predetermined maximum number of characters per segment multiplied by a predetermined maximum number of segments per multi-segment SMS message;

if the ascertaining is in the positive, display in a user interface an indicator of a number of segments in the multi-segment SMS message that is equal to the predetermined maximum number of segments per multi-segment SMS message; and further display in the user interface an indicator of a number of characters, in excess of the predetermined maximum total length L for a multi-segment SMS message, by which the e-mail message has been shortened.

15. The non-transitory computer-readable medium of claim 14 wherein the name of the contact comprises a first name and a surname.

16. A computing device comprising at least one processor and a memory, the memory storing instructions which, when executed by the at least one processor, adapt the computing device to:
- receive an e-mail message over an electronic mail (e-mail) message handling service;
- receive an indication that the e-mail message should be forwarded as a Short Message Service (SMS) message over an SMS message handling service;
- ascertain whether the e-mail message, when converted to an SMS message, would exceed a predetermined maximum total length L for a multi-segment SMS message, the predetermined maximum total length L being based on a predetermined maximum number of characters per segment multiplied by a predetermined maximum number of segments per multi-segment SMS message;
- if the ascertaining is in the positive, display in a user interface an indicator of a number of segments in the multi-segment SMS message that is equal to the predetermined maximum number of segments per multi-segment SMS message; and
- further display in the user interface an indicator of a number of characters, in excess of the predetermined maximum total length L for a multi-segment SMS message, by which the e-mail message has been shortened.

17. The computing device of claim 16 wherein the name of the contact comprises a first name and a surname.

\* \* \* \* \*